United States Patent [19]

Ichinoi et al.

[11] Patent Number: 5,513,009
[45] Date of Patent: Apr. 30, 1996

[54] HIGH-DEFINITION PICTURE SIGNAL RECORDING/REPRODUCING APPARATUS FOR RECORDING AND REPRODUCING A HIGH-DEFINITION PICTURE SIGNAL CONTROLLED ITS AMPLITUDE LEVEL

[75] Inventors: Yutaka Ichinoi; Masahiko Turuta, both of Yokohama, Japan

[73] Assignee: Victor Company of Japan, Ltd., Yokohama, Japan

[21] Appl. No.: 224,493

[22] Filed: Apr. 7, 1994

[30] Foreign Application Priority Data

Apr. 7, 1993 [JP] Japan ..................... 5-105149

[51] Int. Cl.[6] .................. H04N 5/76; H04N 5/78; H04N 9/79
[52] U.S. Cl. .................. 358/335; 358/315; 360/33.1
[58] Field of Search .................. 358/310, 335, 358/342, 315, 327; 360/33.1; H04N 5/76, 5/78, 5/781, 5/782, 5/783, 5/92, 9/79

[56] References Cited

U.S. PATENT DOCUMENTS

| | | |
|---|---|---|
| 4,630,131 | 12/1986 | Ichinoi et al. |
| 4,758,898 | 7/1988 | Itou et al. ............ 358/315 |
| 5,159,460 | 10/1992 | Senso . |
| 5,276,562 | 1/1994 | Sakamoto ............ 358/315 |
| 5,311,324 | 5/1994 | Temma et al. ............ 358/342 |

FOREIGN PATENT DOCUMENTS 63-203075  8/1988  Japan .
501554A3  2/1991  Japan .

OTHER PUBLICATIONS

"Wide Band Video Signal Recorder Having Level and Linearity Corrector", T. Bannai et al., IEEE Transactions on Consumer Electronics, vol. CE-32, No. 3, Aug. 1986.

Primary Examiner—Thai Q. Tran
Attorney, Agent, or Firm—Lowe, Price, LeBlanc & Becker

[57] ABSTRACT

A level standard signal including a level reference signal and an information signal is interposed in a particular horizontal scanning line (a 603-line) of an HD picture signal. An amplitude level of the HD picture signal is corrected according to the level reference signal in a level correcting section, and an input level of the level standard signal is changed to a recording level according to the level reference signal in a recording level standard signal generating section to generate a recording level standard signal. Also, peripheral horizontal scanning lines of the HD picture signal placed at peripheral portions of an image plane are deleted in a signal dividing section, and a TCI signal is generated. The recording level standard signal is interposed in the TCI signal to generate a composite signal, and the composite signal is recorded in a magnetic tape. The composite signal is reproduced and changed to another HD signal in which an output level standard signal including an output level reference signal and an output information signal are interposed in the particular horizontal scanning line.

22 Claims, 21 Drawing Sheets

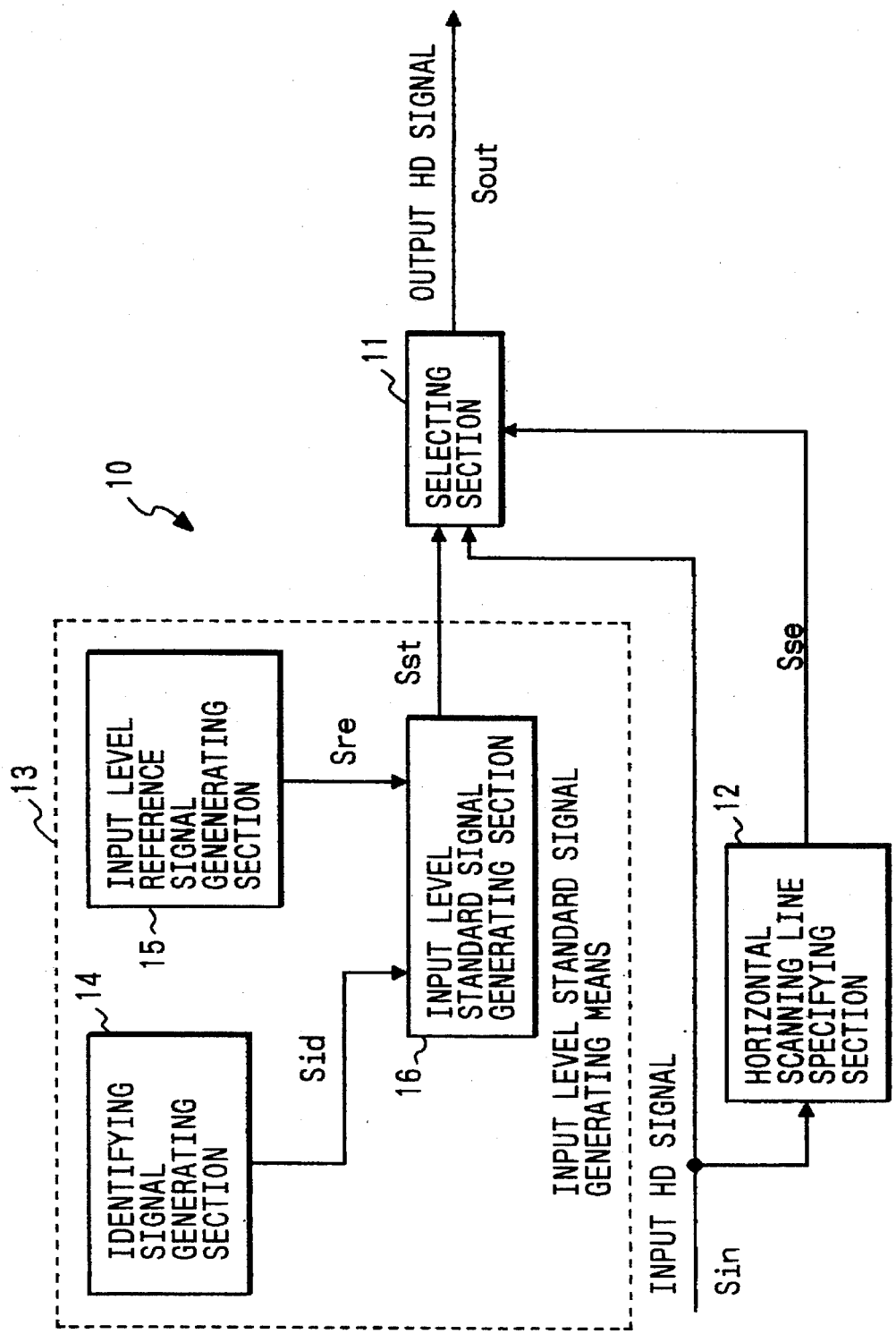

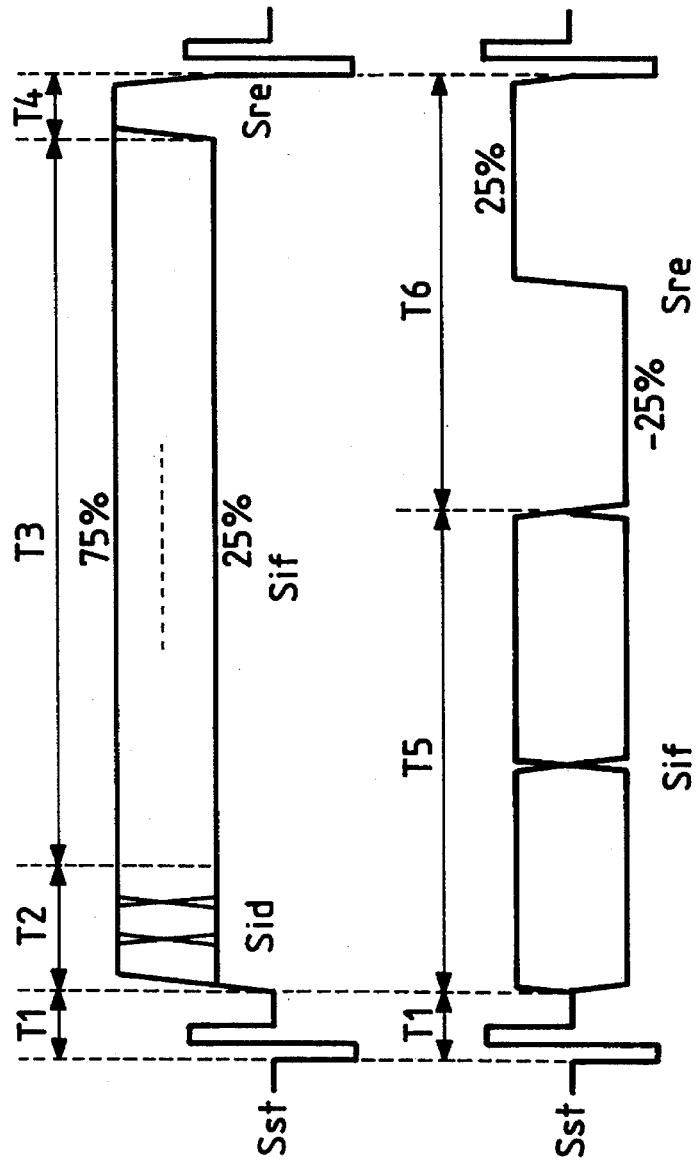
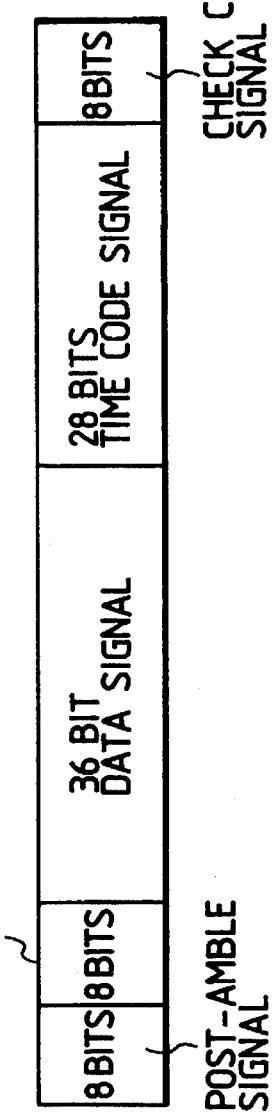
FIG. 6A
FIG. 6B
FIG. 6C

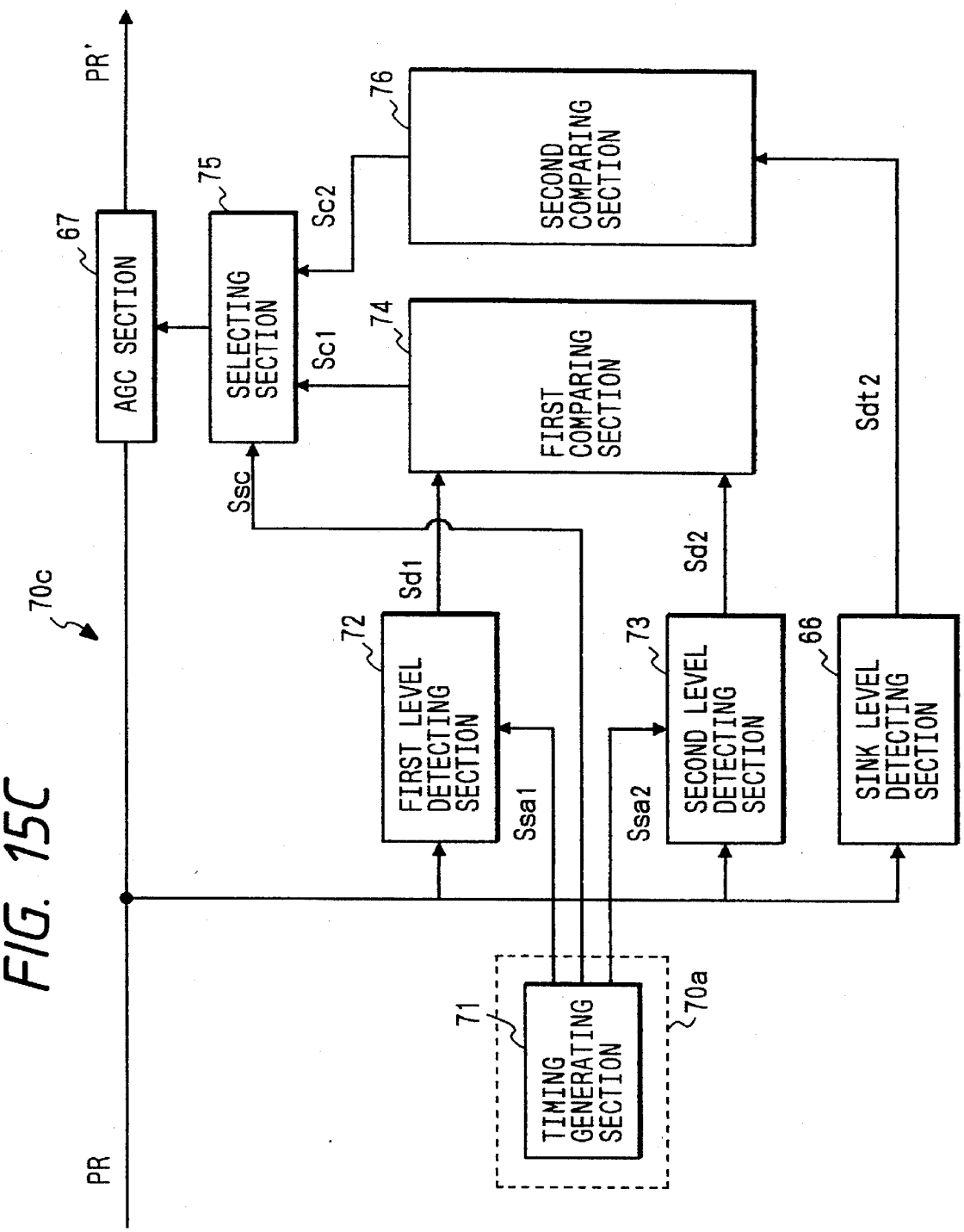

HIGH-DEFINITION PICTURE SIGNAL RECORDING/REPRODUCING APPARATUS FOR RECORDING AND REPRODUCING A HIGH-DEFINITION PICTURE SIGNAL CONTROLLED ITS AMPLITUDE LEVEL

BACKGROUND OF THE INVENTION

1. Field of the Invention

The present invention relates to a high-definition picture signal recording apparatus for recording a high-definition picture signal of which an amplitude level is controlled, a high-definition picture signal reproducing apparatus for reproducing a high-definition picture signal of which an amplitude level is controlled, and a high-definition picture signal recording/reproducing apparatus for recording and reproducing a high-definition picture signal of which an amplitude level is controlled.

2. Description of the Related Art

A broad-band type of high-definition picture signal such as a high-vision signal (hereinafter, called a HD picture signal) and an extended definition television signal (hereinafter, called an EDTV signal) have been recently known. The number of horizontal scanning lines in a frame of picture image displayed with the high-definition picture signal is higher than that in a frame of picture image displayed with a conventional picture signal such as a national television system committee (NTSC) type of signal. In an apparatus utilizing the high-definition picture signal, the signal is digitized to perform various types of digital processing for a digital signal. Therefore, because a dynamic range of the digital signal is strictly limited to perform the digital processing, it is required to control an amplitude level of the high-definition picture signal.

To control the amplitude level of high-definition picture signal in a conventional method, a synchronizing signal is synchronized with the high-definition picture signal, an amplitude level of the synchronizing signal is detected, and the amplitude level of the high-definition picture signal is controlled according to the amplitude level of the synchronizing signal. However, the high-definition picture signal is often processed according to various types of digital processing in an apparatus utilizing the high-definition picture signal while deleting a part of the high-definition picture signal transferred in vertical blanking periods and horizontal synchronizing signal periods to minimize a capacity of memories for storing the high-definition picture signal. Therefore, in cases where the amplitude level of the high-definition picture signal is corrected according to the amplitude level of the synchronizing signal, there is a drawback that the correction of the amplitude level is not accurate.

To solve the drawback, a level standard signal adding apparatus in which a level standard signal is added to one of horizontal scanning lines to which a high-definition picture signal is allocated and a high-vision signal to which the level standard signal is added have been proposed by this applicant.

Also, an amplitude level correcting apparatus in which an amplitude level of a high-definition picture signal is corrected according to a level standard signal has been proposed by this applicant.

3. Problems to be Solved by the Invention

However, a high-definition picture signal is recorded with a recording/reproducing apparatus while deleting a part of the high-definition picture signal allocated to peripheral horizontal scanning lines placed at upper and lower peripheral portions of an image plane. In this case, the level standard signal cannot be recorded in a recording medium of the recording/reproducing apparatus because of the deletion of the level standard signal even though the level standard signal is added to the peripheral horizontal scanning lines. Therefore, even though the high-definition picture signal is recorded and reproduced with the recording/reproducing apparatus after the amplitude level of the high-definition picture signal is corrected in a level correcting apparatus provided in a recording section of the recording/reproducing apparatus, there is a drawback that an amplitude level error of the high-definition picture signal generated in the recording/reproducing apparatus cannot be eliminated.

Also, in cases where an information signal is multiplexed in the level standard signal, there is another drawback that the information signal is undesirably deleted because of the deletion of the level standard signal.

SUMMARY OF THE INVENTION

A first object of the present invention is to provide, with due consideration to the drawbacks of such a conventional high-definition picture signal recording/reproducing apparatus, a high-definition picture signal recording apparatus in which an amplitude level error of a high-definition picture signal is eliminated even though the high-definition picture signal is recorded. Also, the first object is to provide a high-definition picture signal reproducing apparatus in which an amplitude level error of a high-definition picture signal is eliminated even though the high-definition picture signal recorded is reproduced. Also, the first object is to provide a high-definition picture signal recording/reproducing apparatus in which an amplitude level error of a high-definition picture signal is eliminated even though the high-definition picture signal is recorded and reproduced.

A second object of tile present invention is to provide a high-definition picture signal recording apparatus, a high-definition picture signal reproducing apparatus or a high-definition picture signal recording/reproducing apparatus in which an information signal multiplexed in a level standard signal is not deleted even though the level standard signal is added to peripheral horizontal scanning lines placed at upper and lower peripheral portions of an image plane.

The first object is achieved by the provision of a high-definition picture signal recording apparatus for recording a high-definition picture signal in which an input level reference signal indicating an amplitude level of the high-definition picture signal is added to a particular horizontal scanning line, comprising:

level correcting means for correcting an amplitude level of a high-definition picture signal to a corrected level according to an input level reference signal of an input level standard signal added to a particular horizontal scanning line of the high-definition picture signal;

recording level reference signal generating means for generating a recording level reference signal according to the input level reference signal of the input level standard signal interposed in the high-definition picture signal of which the amplitude level is corrected in the level correcting means;

high-definition picture signal processing means for processing the high-definition picture signal of which the amplitude level is corrected in the level correcting means by deleting line signals of the high-definition picture signal allocated to peripheral horizontal scanning lines placed at upper and lower peripheral portions of an image plane and deleting the input level reference signal of the input level standard signal interposed in the high-definition picture signal, a recording picture signal being generated in the high-definition picture signal processing means;

composite signal generating means for interposing the recording level reference signal generated in the recording level reference signal generating means in the recording picture signal generated in the high-definition picture signal processing means to generate a composite signal; and recording means for recording the composite signal generated in the composite signal generating means in a recording medium.

In the above configuration, a frame of high-definition picture signal such as a luminance signal, a first color difference signal or a second color difference signal is composed of a plurality of line signals allocated to a plurality of horizontal scanning lines other than a particular horizontal scanning line and an input level reference signal added to the particular horizontal scanning line. When the high-definition picture signal is input to the high-definition picture signal recording apparatus, an amplitude level of the high-definition picture signal is corrected in the level correcting means according to the input level reference signal.

Thereafter, a recording level reference signal is generated in the recording level reference signal generating means according to the input level reference signal. In detail, the recording level reference signal is formed by changing an input level of tile input level reference signal to a recording level.

Also, a part of line signals of the high-definition picture signal allocated to peripheral horizontal scanning lines placed at upper and lower peripheral portions of an image plane is deleted to decrease the amount of the line signals of the high-definition picture signal recorded in a recording medium. In addition, the input level reference signal interposed in the high-definition picture signal is deleted because the recording level reference signal is utilized in place of the input level reference signal. Therefore, a recording picture signal is generated.

Thereafter, the recording level reference signal is interposed in the recording picture signal to generate a composite signal. Thereafter, the composite signal is recorded in a recording medium.

Accordingly, even though a part of line signals of the high-definition picture signal allocated to peripheral horizontal scanning lines placed at upper and lower peripheral portions of an image plane is deleted, the recording level reference signal can be interposed in the high-definition picture signal because the recording level reference signal is generated in the recording level reference signal generating means prior to the deletion of the input level reference signal. Therefore, the composite signal including the recording level reference signal and the recording picture signal can be recorded in the recording medium, and an amplitude level error of tile high-definition picture signal can be eliminated even though the recording picture signal generated from the high-definition picture signal is recorded.

The first object is also achieved by the provision of a high-definition picture signal reproducing apparatus, comprising:

composite signal reproducing means for reproducing a composite signal from a recording medium, the composite signal being composed of a recording picture signal obtained by deleting line signals of an input high-definition picture signal allocated to peripheral horizontal scanning lines placed at upper and lower peripheral portions of an image plane and a recording level reference signal indicating an amplitude level of the input high-definition picture signal;

output level reverence signal generating means for generating an output level reference signal according to the recording level reference signal included in the composite signal reproduced in the composite signal reproducing means;

output high-definition picture signal generating means for generating an output high-definition picture signal by interposing the output level reference signal generated in the output level reference signal generating means in the recording picture signal of the composite signal reproduced in the composite signal reproducing means, the output level reference signal being added to a particular horizontal scanning line of the output high-definition picture signal, and the output level reference signal indicating an amplitude level of the output high-definition picture signal; and output means for outputting the output high-definition picture signal.

In the above configuration, a composite signal is recorded in a recording medium and is composed of a recording picture signal obtained by deleting line signals of an input high-definition picture signal allocated to peripheral horizontal scanning lines placed at upper and lower peripheral portions of an image plane and a recording level reference signal indicating an amplitude level of the input high-definition picture signal.

The composite signal is reproduced from the recording medium with the composite signal reproducing means. Thereafter, an output level reference signal is generated in the output level reference signal generating means according to the recording level reference signal included in the composite signal. Thereafter, an output high-definition picture signal is generated in the output high-definition picture signal generating means by interposing the output level reference signal in the recording picture signal of the composite signal. That is, the output level reference signal is added to a particular horizontal scanning line of the output high-definition picture signal. Also, the output level reference signal indicates an amplitude level of the output high-definition picture signal. Thereafter, the output high-definition picture signal is output.

Accordingly, even though the composite signal composed of a recording picture signal obtained by deleting line signals of an input high-definition picture signal allocated to peripheral horizontal scanning lines placed at upper and lower peripheral portions of an image plane and a recording level reference signal indicating an amplitude level of the input high-definition picture signal is recorded in a recording medium, the output high-definition picture signal in which the output level reference signal is interposed can be reproduced. Therefore, an amplitude level error of the output high-definition picture signal can be eliminated.

The first object is also achieved by the provision of a high-definition picture signal recording/reproducing apparatus for recording an input high-definition picture signal in which an input level reference signal indicating an amplitude level of the high-definition picture signal is added to a particular horizontal scanning line and reproducing an output high-definition picture signal, comprising:

level correcting means for correcting an amplitude level of an input high-definition picture signal to a corrected level according to an input level reference signal of an input level standard signal added to a particular horizontal scanning line of the input high-definition picture signal;

recording level reference signal generating means for generating a recording level reference signal according to the input level reference signal of the input level standard signal interposed in the input high-definition picture signal of which the amplitude level is corrected in the level correcting means;

high-definition picture signal processing means for processing the input high-definition picture signal of which the amplitude level is corrected in the level correcting means by deleting line signals of the input high-definition picture signal allocated to peripheral horizontal scanning lines placed at upper and lower peripheral portions of an image plane and deleting the input level reference signal of the input level standard signal interposed in the input high-definition picture signal, a recording picture signal being generated in the high-definition picture signal processing means;

composite signal generating means for interposing the recording level reference signal generated in the recording level reference signal generating means in the recording picture signal generated in the high-definition picture signal processing means to generate a composite signal, the recording level reference signal indicating an amplitude level of the recording picture signal;

recording and reproducing means for recording the composite signal generated in the composite signal generating means in a recording medium and reproducing the composite signal from the recording medium;

output level reference signal generating means for generating an output level reference signal according to the recording level reference signal included in the composite signal reproduced in the recording and reproducing means;

output high-definition picture signal generating means for generating an output high-definition picture signal by interposing the output level reference signal generated in the output level reference signal generating means in the recording picture signal of the composite signal reproduced in the composite signal reproducing means, the output level reference signal being added to a particular horizontal scanning line of the output high-definition picture signal, and the output level reference signal indicating an amplitude level of the output high-definition picture signal; and output means for outputting the output high-definition picture signal.

In the above configuration, the input high-definition picture signal in which the input level reference signal is interposed is changed to the composite signal in which the recording level reference signal is interposed, and the composite signal is recorded and reproduced in the recording and reproducing means. Thereafter, the composite signal is changed to the output high-definition picture signal in which the output level reference signal is interposed.

Accordingly, amplitude level errors of the input and output high-definition picture signals can be eliminated.

The first and second objects are achieved by the provision of a high-definition picture signal recording apparatus for recording a high-definition picture signal in which an input level standard signal composed of an input level reference signal indicating an amplitude level of the high-definition picture signal and an input information signal indicating a piece of prescribed information is added to a particular horizontal scanning line, comprising:

level correcting means for correcting an amplitude level of a high-definition picture signal to a corrected level according to an input level reference signal of an input level standard signal added to a particular horizontal scanning line of the high-definition picture signal;

recording level reference signal generating means for generating a recording level reference signal according to the input level reference signal of the input level standard signal interposed in the high-definition picture signal of which the amplitude level is corrected in the level correcting means;

high-definition picture signal processing means for processing the high-definition picture signal of which the amplitude level is corrected in the level correcting means by deleting line signals of the high-definition picture signal allocated to peripheral horizontal scanning lines placed at upper and lower peripheral portions of an image plane and deleting the input level reference signal of the input level standard signal interposed in the high-definition picture signal, a recording picture signal being generated in the high-definition picture signal processing means;

recording information signal generating means for replacing a piece of prescribed information obtained by decoding an input information signal of the input level standard signal interposed in the high-definition picture signal of which the amplitude level is corrected in the level correcting means with a piece of new information and generating a recording information signal by encoding the new information;

composite signal generating means for interposing the recording level reference signal generated in the recording level reference signal generating means and the recording information signal generated in the recording information signal generating means in the recording picture signal generated in the high-definition picture signal processing means to generate a composite signal; and recording means for recording the composite signal generated in the composite signal generating means in a recording medium.

In the above configuration, an input information signal indicating a piece of prescribed information is multiplexed in an input level standard signal, and the input level standard signal is interposed in a high-definition picture signal. The input information signal is decoded to obtain the prescribed information, and the prescribed information is replaced with a piece of new information if necessary in the recording information signal generating means. Thereafter, the new information is encoded to generate a recording information signal, and the recording information signal is multiplexed in a composite signal in the composite signal generating means.

Accordingly, the input information signal multiplexed in the input level standard signal is not deleted even though the input level standard signal is added to peripheral horizontal scanning lines placed at upper and lower peripheral portions of an image plane.

The first and second objects are also achieved by the provision of a high-definition picture signal reproducing apparatus, comprising:

composite signal reproducing means for reproducing a composite signal from a recording medium, the composite signal being composed of a recording picture signal obtained by deleting line signals of an input high-definition picture signal allocated to peripheral horizontal scanning lines placed at upper and lower peripheral portions of an image plane, a recording level reference signal indicating an amplitude level of the input high-definition picture signal and a recording information signal indicating a prescribed information;

output level reference signal generating means for generating an output level reference signal according to the recording level reference signal included in the composite signal reproduced in the composite signal reproducing means;

output information signal generating means for replacing the prescribed information obtained by decoding the recording information signal of the composite signal reproduced in the composite signal reproducing means with a piece of new information and generating an output information signal by encoding the new information;

output high-definition picture signal generating means for generating an output high-definition picture signal by interposing an output level standard signal composed of the output level reference signal generated in the output level reference signal generating means and the output information signal generated in the output information signal generating means in the recording picture signal of the composite signal reproduced in the composite signal reproducing means, the output level standard signal being added to a particular horizontal scanning line of the output high-definition picture signal, and the output level reference signal indicating an amplitude level of the output high-definition picture signal; and output means for outputting the output high-definition picture signal.

In the above configuration, a recording information signal indicating a prescribed information is multiplexed in a composite signal. The prescribed information is obtained in the output information signal generating means by decoding the recording information signal and is replaced with a piece of new information if necessary. Thereafter, the new information is encoded to generate an output information signal. The output information signal is multiplexed in an output level standard signal, and the output level standard signal is interposed in an output high-definition picture signal in the output high-definition picture signal generating means.

Accordingly, the recording information signal multiplexed in the recording level standard signal is not deleted even though the recording level standard signal is added to peripheral horizontal scanning lines placed at upper and lower peripheral portions of an image plane.

The first and second objects are also achieved by the provision of a high-definition picture signal recording/reproducing apparatus for recording an input high-definition picture signal in which an input level standard signal composed of an input level reference signal indicating an amplitude level of the high-definition picture signal and an input information signal indicating a piece of prescribed information is added to a particular horizontal scanning line and reproducing an output high-definition picture signal, comprising:

level correcting means for correcting an amplitude level of an input high-definition picture signal to a corrected level according to an input level reference signal of an input level standard signal added to a particular horizontal scanning line of the input high-definition picture signal;

recording level reference signal generating means for generating a recording level reference signal according to the input level reference signal of the input level standard signal interposed in the input high-definition picture signal of which the amplitude level is corrected in the level correcting means;

high-definition picture signal processing means for processing the input high-definition picture signal of which the amplitude level is corrected in the level correcting means by deleting line signals of the input high-definition picture signal allocated to peripheral horizontal scanning lines placed at upper and lower peripheral portions of an image plane and deleting the input level reference signal of the input level standard signal interposed in the input high-definition picture signal, a recording picture signal being generated in the high-definition picture signal processing means;

recording information signal generating means for replacing a piece of prescribed information obtained by decoding an input information signal of the input level standard signal interposed in the input high-definition picture signal of which the amplitude level is corrected in the level correcting means with a piece of first replaced information and generating a recording information signal by encoding the first replaced information;

composite signal generating means for interposing the recording level reference signal generated in the recording level reference signal generating means and the recording information signal generated in the recording information signal generating means in the recording picture signal generated in the high-definition picture signal processing means to generate a composite signal;

recording and reproducing means for recording the composite signal generated in the composite signal generating means in a recording medium and reproducing the composite signal from the recording medium;

output level reference signal generating means for generating an output level reference signal according to the recording level reference signal included in the composite signal reproduced in the recording and reproducing means;

output information signal generating means for replacing the the first replaced information obtained by decoding the recording information signal of the composite signal reproduced in the recording and reproducing means with a piece of second replaced information and generating an output information signal by encoding the second replaced information;

output high-definition picture signal generating means for generating an output high-definition picture signal by interposing an output level standard signal composed of the output level reference signal generated in the output level reference signal generating means and the output information signal generated in the output information signal generating means in the recording picture signal of the composite signal reproduced in the composite signal reproducing means, the output level standard signal being added to a particular horizontal scanning line of the output high-definition picture signal, and the output level reference signal indicating an amplitude level of the output high-definition picture signal; and output means for outputting the output high-definition picture signal.

In the above configuration, an input information signal indicating a piece of prescribed information is multiplexed in an input level standard signal, and the input level standard signal is interposed in an input high-definition picture signal. The input information signal is changed to a recording information signal, and the recording information signal is multiplexed in a composite signal in the composite signal generating means. Thereafter, the composite signal is recorded and reproduced in the recorded and reproducing means. Thereafter, the recording information signal is changed to an output information signal, the output information signal is multiplexed in an output level standard signal, and the output level standard signal is interposed in an output high-definition picture signal in the output high-definition picture signal generating means.

Accordingly, the input information signal multiplexed in the input level standard signal is not deleted even though the input level standard signal is added to peripheral horizontal scanning lines placed at upper and lower peripheral portions of an image plane. Also, the recording information signal multiplexed in the recording level standard signal is not deleted even though the recording level standard signal is added to peripheral horizontal scanning lines placed at upper and lower peripheral portions of an image plane.

BRIEF DESCRIPTION OF THE DRAWINGS

The objects, features and advantages of the present invention will be apparent from the following description taken in conjunction with the accompanying drawings, in which:

FIG. 1 is a block diagram of an input level standard signal generating apparatus;

FIGS. 6A, 6B is respectively a waveform of another input level standard signal Sst interposed in an input HD picture signal Sin to obtain another output HD picture signal Sout;

FIG. 6C shows a configuration of a combined signal composed of an identifying signal Sid and an information signal Sif included in the input level standard signal Sst shown in FIG. 5A, 6A or 6B;

FIG. 15C shows a block diagram of a level correcting section pertaining to a second color difference signal PR according to the modification of the first embodiment;

DETAIL DESCRIPTION OF THE PREFERRED EMBODIMENTS

Preferred embodiments of a high-definition picture signal recording/reproducing apparatus according to the present invention are described with reference to drawings.

A generating method and apparatus for generating an input level standard signal is described prior to the description of a high-definition picture signal recording/reproducing apparatus.

In an input level standard signal generating method and apparatus, an input level standard signal having a piece input level information is added to an effective horizontal scanning line, which pertains to a high-definition picture signal transferred in a limited period except a vertical blanking period, in place of a part of the picture signal. In addition, the input level standard signal also has an identifying signal to distinguish the input level standard signal from the picture signal.

In this specification, an HD picture signal such as a luminance signal, a first color difference signal or a second color difference signal is utilized as an example of the high-definition picture signal.

Figures 2A, 2B:
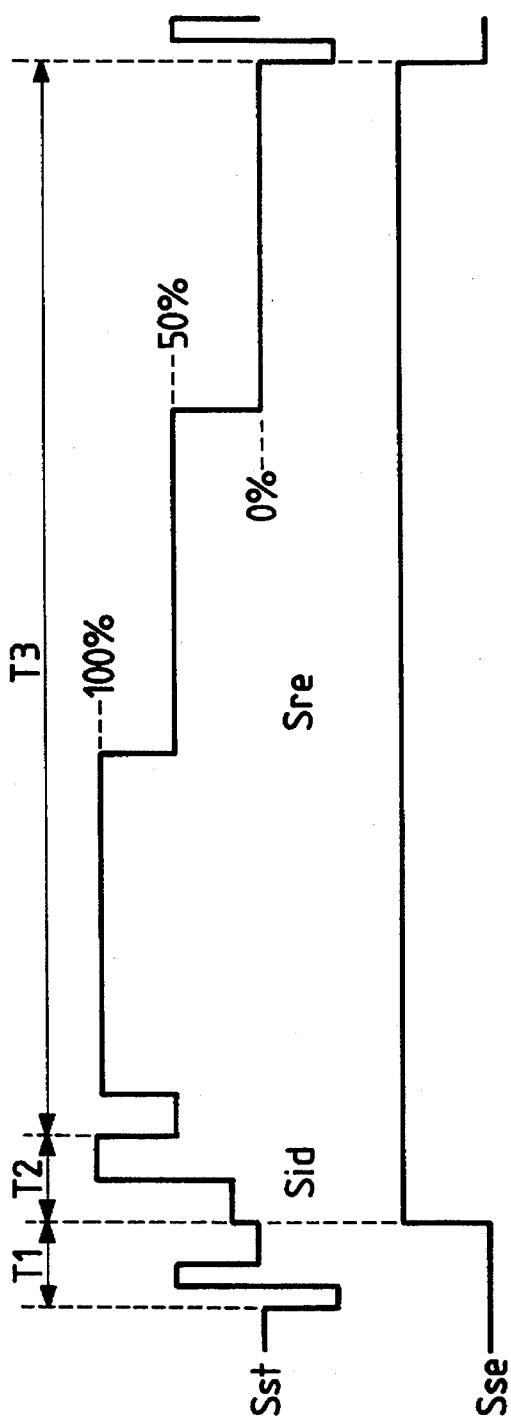
FIG. 2A shows a waveform of an input level standard signal Sst generated in an input level standard signal generating section shown in FIG. 1.
FIG. 2B shows a waveform of a first selecting signal Sse.

FIG. 1 is a block diagram of an input level standard signal generating apparatus. FIG. 2B shows a waveform of a first selecting signal Sse.

As shown in FIG. 1, in an input level standard-signal generating apparatus 10, an input HD picture signal Sin is transferred one after another to a selecting section 11 and a horizontal scanning line specifying section 12 through a transmission path. The input HD picture signal Sin is a signal selected from among a luminance signal Y, a first color difference signal PB and a second color difference signal PR in conformity to Japanese high-vision standards. That is, the signals Y, PB and PR are formed by transforming three primary color signals such as a red signal R, a green signal G and a blue signal B according to equations (1), (2) and (3).

$$Y1 = 0.7154*G + 0.0721*B + 0.2125*R \quad (1)$$

$$PB1 + 0.5389*(-0.7154*G + 0.9279*B - 0.2125*R) \quad (2)$$

$$PR1 = 0.6349*(-0.7154*G - 0.0721*B + 0.7875*R) \quad (3)$$

Here, the symbols Y1, PB1 and PR1 denote an input amplitude level of the luminance signal Y, an input amplitude level of the first color difference signal PB and an input amplitude level of the second color difference signal PR.

In the horizontal scanning line specifying section 12, vertical synchronizing signals included in the input HD signals Sin are separated from horizontal synchronizing signals included in the input HD signals Sin, and the number of vertical synchronizing signals and the number of horizontal synchronizing signals are counted to specify a particular horizontal scanning line to which an input level standard signal Sst transferred from an input level standard signal generating means 13 to the selecting signal 11 is prepared to be interposed. Thereafter, a first selecting signal Sse shown in FIG. 2B is transferred from the specifying section 12 to the selecting section 11.

The input level standard signal generating means 13 comprises an identifying signal generating section 14 for generating an identifying signal Sid having a 2-bit length, an input level reference signal generating section 15 for generating an input level reference signal Sre having three reference levels of 100%, 50% and 0%, and an input level standard signal generating section 16 for combining the identifying signal Sid and the input level reference signal Sre to generate the input level standard signal Sst. The input level reference signal Sre is utilized to adjust an amplitude level of the input HD picture signal in a high-definition picture signal recording/reproducing apparatus according to the reference levels of 100%, 50% and 0%.

FIG. 2A shows a waveform of the input level standard signal Sst generated in the input level standard signal generating section 16 shown in FIG. 1.

As shown in FIG. 2A, the input level standard signal Sst generated in the input level standard signal generating section 16 is composed of the identifying signal Sid added to the particular horizontal scanning line in a second period T2 subsequent to a first period T1 in which a horizontal synchronizing signal of the input HD picture signal Sin is transferred to the particular horizontal scanning line and the input level reference signal Sre added to the particular horizontal scanning line in a third period T3 subsequent to the second period T2. The reason that the identifying signal Sid is interposed in the input level standard signal Sst prior to the input level reference signal Sre is to judge whether or not a signal pertaining to the particular horizontal scanning line is the input level standard signal Sst.

In the selecting section 11, when the first selecting signal Sse is set to a low level, the input HD picture signal Sin is selected. In contrast, when the first selecting signal Sse is set to a high level, the input level standard signal Sst generated in the input level standard signal generating section 16 is selected. Therefore, an output HD picture signal Sout in which the input level standard signal Sst added to the particular horizontal scanning line is interposed in the input HD picture signal Sin in place of a part of the input HD picture signal Sin pertaining to the third period T3 is output from the selecting section 11 to a transmission path.

The selection of the particular horizontal scanning line is described with reference to FIG. 3.

Figure 3:
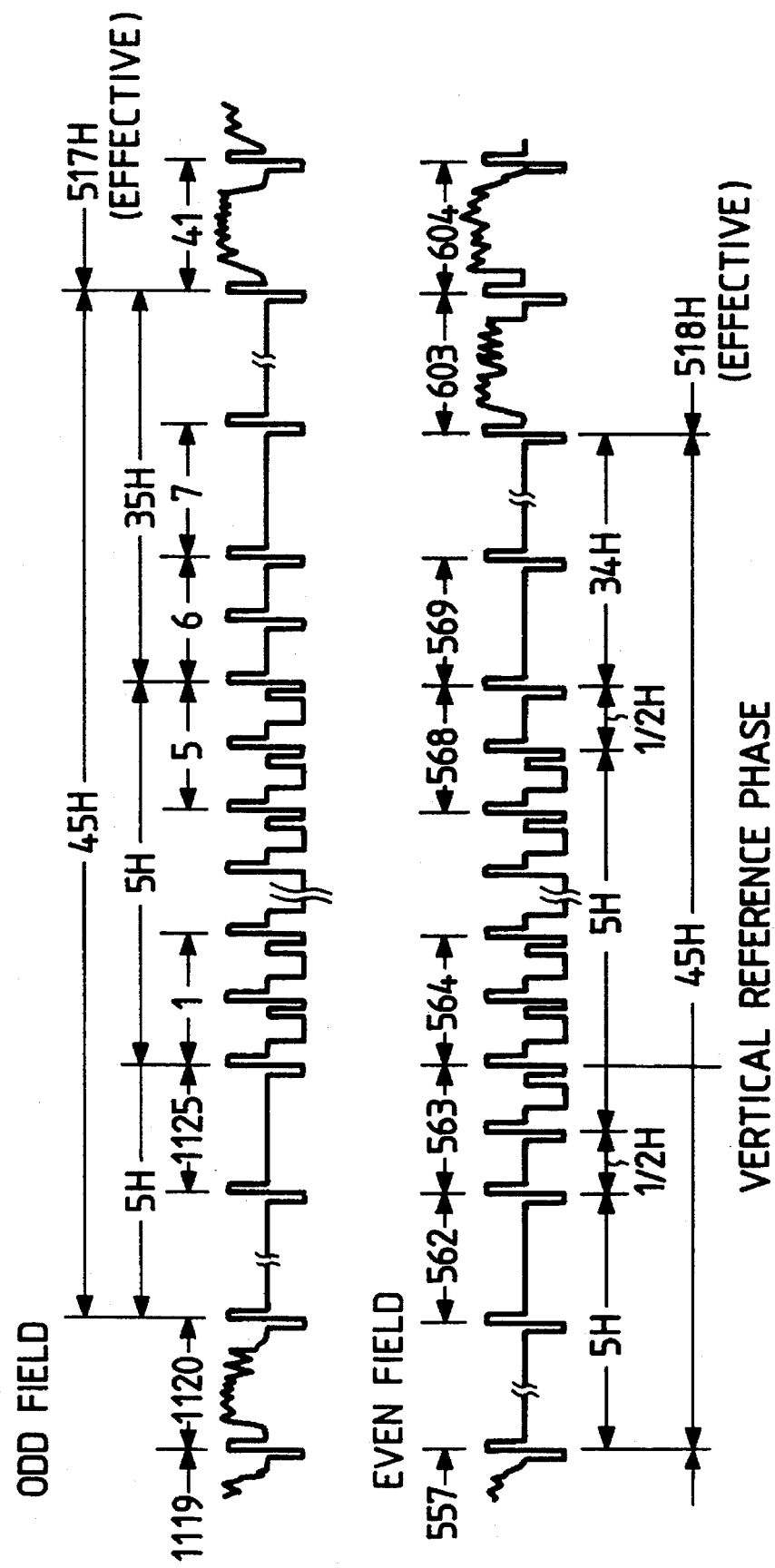
FIG. 3 shows a series of waveforms of an input HD signal Sin pertaining to various numbers of the horizontal scanning lines.

FIG. 3 shows a series of waveforms of the input HD signal Sin pertaining to various numbers of the horizontal scanning lines. The numerals shown in FIG. 3 denote the numbers of the horizontal scanning lines, and the input HD signal Sin pertaining to the first horizontal scanning line is a vertical synchronizing signal of an odd field.

As shown in FIG. 3, the input HD signal Sin comprises a plurality of line signals allocated at a plurality of horizontal scanning lines numbered by various numerals. The particular horizontal scanning line to which the input level standard signal Sst is added in the selecting section 11 is selected from among all of the horizontal scanning lines of a frame of picture image displayed in an image plane. In this case, parts of the output HD picture signal Sout transferred in the vertical blanking periods in which the vertical synchronizing signals are transferred and the horizontal synchronizing signal periods are sometimes deleted according to a function of a high-vision apparatus. Therefore, the input level standard signal Sst is required to be added to one of the effective horizontal scanning lines. Also, because the input level standard signal Sst is not the picture signal, a monitor is required to have an over-scan characteristic in which an over-scan ratio for all of the horizontal scanning lines ranges from 8% to 10% to prevent any image pertaining to the input level standard signal Sst from being displayed in the image plane of the monitor.

Therefore, one or more particular horizontal scanning lines are selected from a plurality of horizontal scanning lines consisting of a first group ranging from the forty-first horizontal scanning line (called the 41-line) to the sixty-sixth horizontal scanning line (called the 66-line), a second group ranging from the five hundred thirty-second horizontal scanning line (called the 532-line) to the five hundred fifty-seventh horizontal scanning line (called the 557-line), a third group ranging from the six hundred third horizontal scanning line (called the 603-line) to the six hundred twenty-eighth horizontal scanning line (called the 628-line), and a fourth group ranging from the one thousand ninety-fifth horizontal scanning line (called the 1095-line) to the one thousand one hundred twentieth horizontal scanning line (called the 1120-line).

Also, the number of horizontal scanning lines overscanned in a monitor differs from that overscanned in another monitor. Therefore, it is preferred that the particular horizontal scanning line be selected from effective horizontal scanning lines which each are emerged in the image plane at a low probability.

Also, the number of horizontal scanning lines in a frame of picture image displayed by utilizing the HD picture signal in conformity to a studio standard is 1035, and an effective picture displaying period is in a first range from the 41-line to the 557-line and a second range from the 603-line to the 1120-line. Also, the number of horizontal scanning lines in a frame of picture image displayed by utilizing a MUSE decoder output signal is 1032, and an effective picture displaying period is in a first range from the 42-line to the 557-line and a second range from the 604-line to the 1119-line.

Accordingly, the 41-line, the 557-line, the 603-line, the 1120-line, the 42-line, the 604-line, the 557-line and the 121-line are respectively an effective horizontal scanning line and are emerged in the image plane at a low probability. Therefore, it is preferred that one or more horizontal scanning lines selected from among the 41-line, the 42-line, the 557-line, the 603-line, the 604-line, the 1120-line and the 1121-line be specified as the particular horizontal scanning line in the specifying section 12.

In addition, the 41-line and the 603-line are not effective horizontal scanning lines in case of the MUSE decoder output signal but are effective horizontal scanning lines in case of the HD picture signal in conformity to the studio standard. Therefore, in cases where it is supposed that any HD signal is not encoded to a MUSE signal, it is preferred that the 41-line and/or the 603-line be specified as the particular horizontal scanning line in the specifying section 12 before the input level standard signal Sst is added to the particular horizontal scanning line. Also, it is preferred that the 603-line or the 604-line be specified as the particular horizontal scanning line in the specifying section 12 because the 604-line is adjacent to the 603-line, and it is preferred that the 41-line or the 42-line be specified as the particular horizontal scanning line in the specifying section 12 because the 42-line is adjacent to the 41-line.

Next, another input level standard signal generating method and apparatus is described with reference to FIGS. 4 to 6.

Figure 4:
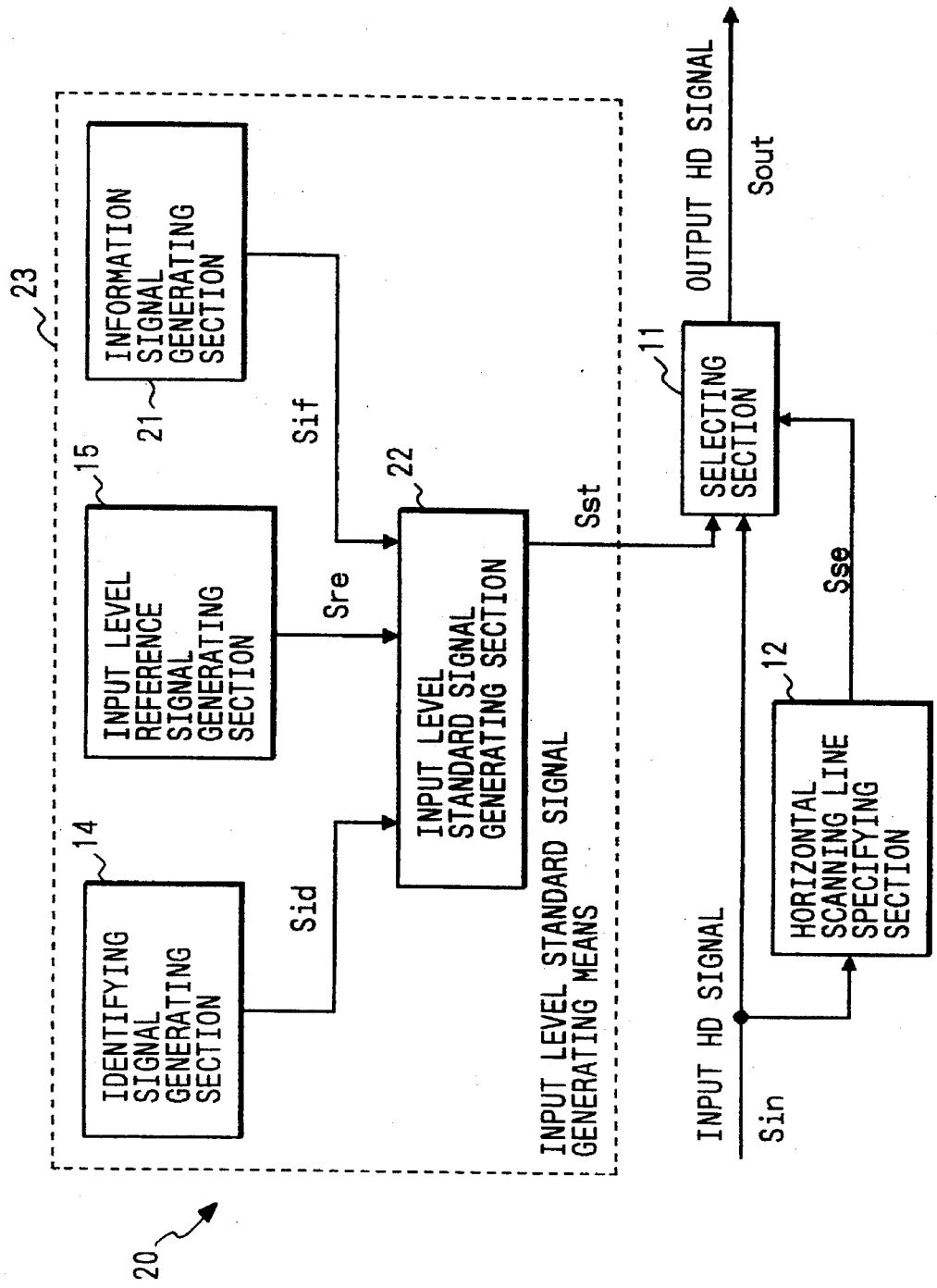
FIG. 4 is a block diagram of another input level standard signal generating apparatus.
Figures 5A, 5B:
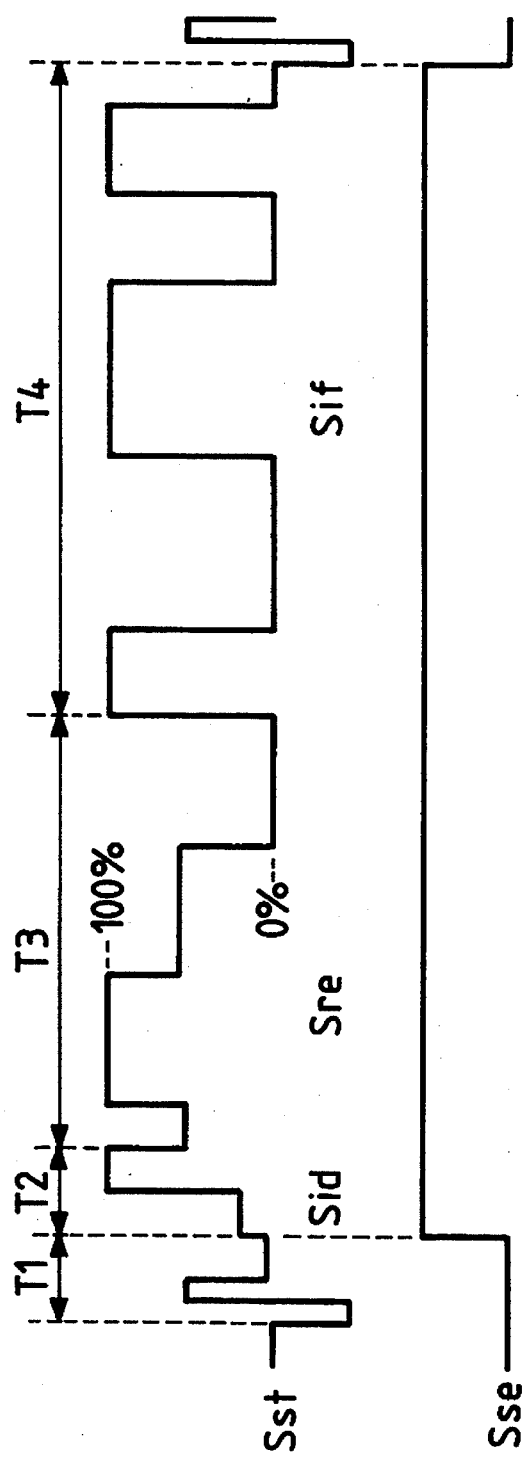
FIG. 5A is a waveform of an input level standard signal Sst interposed in an input HD picture signal Sin to obtain an output HD picture signal Sout.
FIG. 5B is a waveform of a first selecting signal Sse.

FIG. 4 is a block diagram of another input level standard signal generating apparatus. FIG. 5A is a waveform of an input level standard signal Sst interposed in an input HD picture signal Sin to obtain an output HD picture signal Sout. FIG. 5B is a waveform of a first selecting signal Sse. FIGS. 6A, 6B is respectively a waveform of another input level standard signal Sst interposed in an input HD picture signal Sin to obtain another output HD picture signal Sout. FIG. 6C shows a configuration of a combined signal composed of an identifying signal Sid and an information signal Sif included in the input level standard signal Sst shown in FIG. 5A, 6A or 6B.

As shown in FIG. 4, an input level standard signal generating apparatus 20 comprises an input level standard signal generating means 23, the selecting section 11, and the horizontal scanning line specifying section 12. The input level standard signal generating means 23 comprises the identifying signal generating section 14, the input level reference signal generating section 15, an information signal generating section 21 for generating a piece of information signal Sif, and an input level standard signal generating section 22 for multiplexing the identifying signal Sid, the input level reference signal Sre and the information signal Sif in that order according to a time sharing process.

In the above configuration, a piece of information signal Sif output from the information signal generating section 21 is a binary signal having two information levels of 0% and 100%. As shown in FIG. 5A, the information signal Sif is added to a particular horizontal scanning line such as the 603-line or the 41-line in a fourth period T4 subsequent to the third period T3 to form an output HD picture signal Sout.

The waveform of the output HD picture signal Sout is not limited to that shown in FIG. 5A. That is, as shown in FIG. 6A, in cases where the input HD picture signal Sin is a luminance signal Y, the identifying signal Sid is added to the particular horizontal scanning line in a second period T2 subsequent to a first period T1 in which the horizontal synchronizing signal of the input HD picture signal pertaining to the particular horizontal scanning line is placed, the information signal Sif is added to the particular horizontal scanning line in a third period T3 subsequent to the second period T2, and the input level reference signal Sre is added to the particular horizontal scanning line in a fourth period T4 subsequent to the third period T3. Therefore, the input level standard signal Sst composed of the identifying signal Sid, the information signal Sif and the input level reference signal Sre is interposed in the input HD picture signal Sin.

A combined signal composed of the identifying signal Sid and the information signal Sif has, for example, a 84-bit length. That is, as shown in FIG. 6C, the combined signal consists of a post-amble signal having an 8-bit length, the identification signal Sid having an 8-bit length, a data signal having a 36-bit length, a 28-bit length time code signal pertaining to the input HD picture signal Sin and a check code signal having an 8-bit length. The signals of the combined signal respectively have a high level of 75% and a low level of 25%. The data signal indicates various pieces of information pertaining to the input HD picture signal Sin such as a piece of information pertaining to a picture displaying form (for example, the existence of a squeeze signal or a letter box signal), a piece of information pertaining to an audio mode (for example, a monophonic mode, a stereophonic mode, a monolingual mode and bilingual mode), a piece of information pertaining to the identification of various programs, a piece of information pertaining to a caption and a piece of editing information. The input level reference signal Sre has an 8-bit length and has a reference level of 75% which is the same as that of the high level in the combined signal.

In contrast, as shown in FIG. 6B, in cases where the input HD picture signal Sin is a first color difference signal PB or a second color difference signal PR, the information signal Sif is added to the particular horizontal scanning line in a fifth period T5 subsequent to the first period T1 in which the horizontal synchronizing signal of the input HD picture signal Sin pertaining to the particular horizontal scanning line is placed, and the input level reference signal Sre is added to the particular horizontal scanning line in a sixth period T6 subsequent to the fifth period T5. The reason that the identifying signal Sid is omitted is that the judgement of whether or not a signal pertaining to the particular horizontal scanning line is the input level standard signal Sst is performed by utilizing the identifying signal Sid interposed in the luminance signal Y which is transferred with the first and second color difference signals PB, PR. Also, the information signal Sif and the input level reference signal Sre respectively have a high level of 25% and a low level of −25%.

Accordingly, because the identifying signal Sid, the input level reference signal Sre and the information signal Sif are multiplexed in time sharing in the input level standard signal Sst, not only a piece of information pertaining to a reference level of input but also various pieces of information pertaining to the input HD picture signal Sin can be added to the particular horizontal scanning line and can be transferred together. Therefore, a transmission efficiency of information can be enhanced.

Also, because the information signal Sif multiplexed in the input level standard signal Sst is not deleted even though a high-vision apparatus in which parts of the input HD picture signal transferred in the vertical blanking periods and the horizontal synchronizing signal periods are deleted is utilized to transfer the input level standard signal Sst, various pieces of information indicated by the information signal Sif can be reliably transferred.

In addition, because not only the identification of the input level reference signal Sre but also the identification of the information signal. Sin can be performed by the identifying signal Sid, a transmission efficiency of information can be enhanced as compared with that a horizontal scanning line in which the identifying signal Sid and the input level reference signal Sre are multiplexed differs from another horizontal scanning line in which the identifying signal Sid and the information signal Sin are multiplexed.

Next, another input level standard signal generating method and apparatus is described with reference to FIG. 7.

The reference levels of the input level reference signal Sre generated in the input level standard signal generating apparatuses 10, 20 are unchangeable. Also, an amplitude level of the input HD picture signal Sin is normal in the generating apparatuses 10, 20. However, there is a case that the input HD picture signal Sin is supplied to an input level standard signal generating apparatus after the input HD picture signal Sin is processed according to an analog processing without deleting error signals synchronized with the input HD picture signal Sin in a signal cable, an amplifier and a distributing element. In this case, an input level standard signal generating apparatus in which reference levels of the input level reference signal Sre are determined while considering amplitude levels of the error signals is required.

Figure 7:
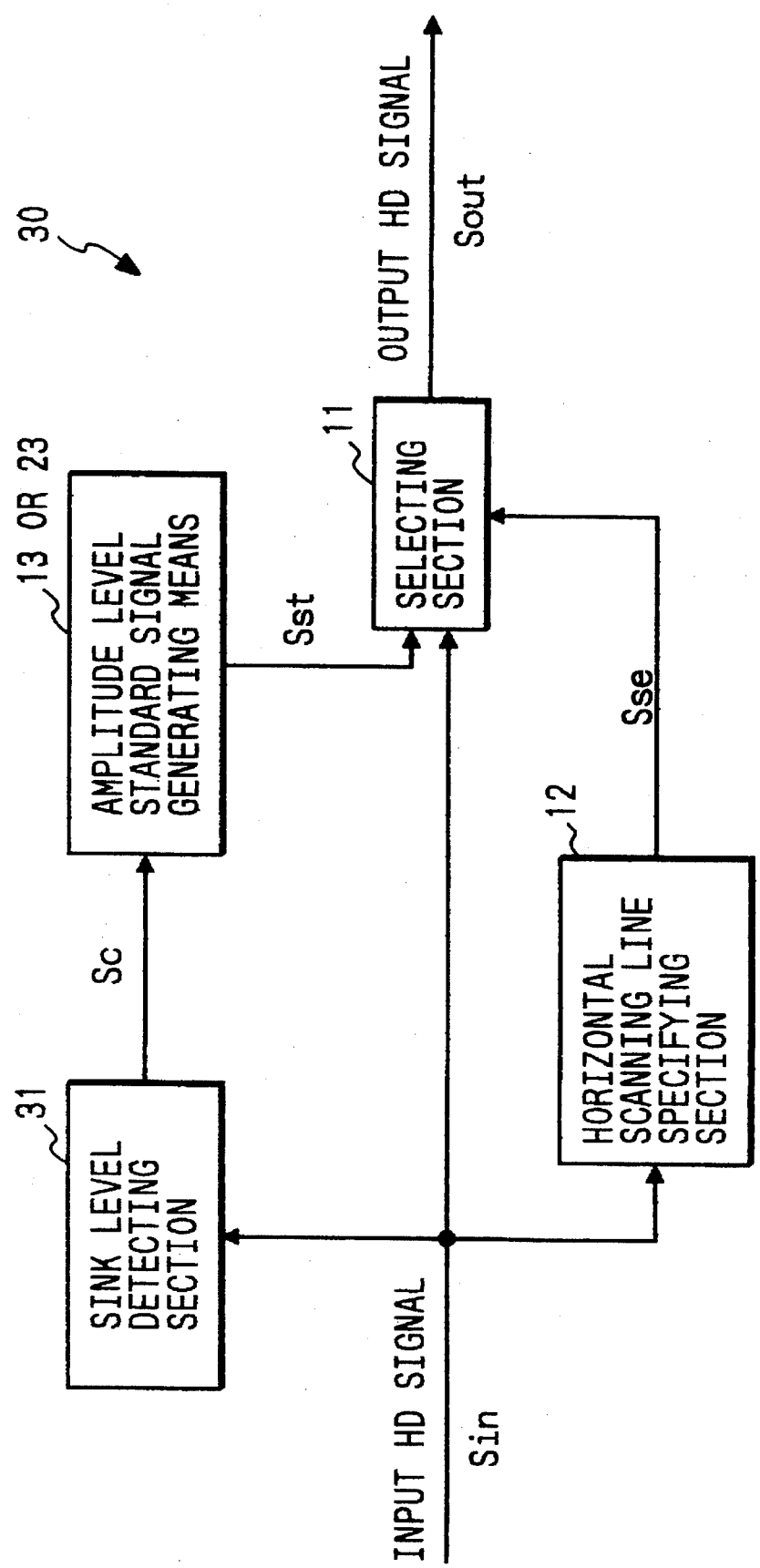
FIG. 7 is a block diagram of an input level standard signal generating apparatus in which reference levels of an input level reference signal Sre are adjusted.

FIG. 7 is a block diagram of an input level standard signal generating apparatus in which reference levels of the input level reference signal Sre are adjusted.

As shown in FIG. 7, an input level standard signal generating apparatus 30 comprises a sink level detecting section 31 for detecting an amplitude level of a horizontal synchronizing signal separated from the input HD picture signal Sin, the input level standard signal generating means 13 or 23, the specifying section 12, and the selecting section 11.

In the above configuration, the input HD picture signal Sin is supplied to the sink level detecting section 31, and a horizontal synchronizing signal is separated from the input HD signal Sin. Thereafter, an amplitude level of the horizontal synchronizing signal is detected in the sink level detecting section 31, and a control signal Sc is supplied to the input level reference signal generating section 15 of the generating means 13 or 23. In the generating section 15, reference levels of an input level reference signal Sre are adjusted according to the control signal Sc. Thereafter, the input level reference signal Sre is multiplexed in time sharing with the identifying signal Sid and the information signal Sif to form the input level standard signal Sst, and the input level standard signal Sst is added to the particular horizontal scanning line in the selecting section 11 to interpose the signal Sst in the input lid picture signal.

Accordingly, even though the input HD picture signal Sin is processed according to an analog processing without deleting error signals synchronized with the input HD picture signal Sin in a signal cable, an amplifier and a distributing element before the input HD picture signal Sin is supplied to the input level standard signal generating apparatus 30, the output HD picture signal Sout in which reference levels of the input level reference signal Sre are determined while considering amplitude levels of the error signals can be generated.

Next, a high-definition picture signal recording/reproducing apparatus according to the present invention is described.

In the present invention, the output HD picture signal Sout generated in the input level standard signal generating apparatus 10, 20 or 30 is input to a high-definition picture signal recording/reproducing apparatus to detect an input level standard signal Sst added to a particular horizontal scanning line of the output HD picture signal Sout, an amplitude level of the HD picture signal is corrected according to an input level reference signal Sre of the input level standard signal Sst, the input level standard signal Sst are decoded, pieces of information indicated by the input level standard signal Sst are replaced with other pieces of information if necessary, and a recording level standard signal obtained by encoding the input level standard signal Sst is recorded in a magnetic tape as a data signal included in a time compressed integration (TCI) signal. Also, the recording level standard signal is reproduced from the magnetic tape and is decoded, pieces of information indicated by the recording level standard signal are replaced with other pieces of information if necessary, an output level standard signal obtained by encoding the recording level standard signal is added to another particular horizontal scanning line of another HD picture signal, and the HD picture signal interposed by the output level standard signal is output.

In a high-definition picture signal recording/reproducing apparatus according to a first embodiment, a luminance signal Y equivalent to the output HD picture signal Sout in which the input level standard signal Sst shown in FIG. 6A is added to the 603-line or the 604-line and first and second color difference signals PB, PR respectively equivalent to the output HD picture signal Sout in which the input level standard signal Sst shown in FIG. 6B is added to the 603-line or the 604-line are processed. Also, a non-interpolated HD picture signal in which the input level standard signal Sst is not added to any horizontal scanning line are processed. The reason that the non-interpolated HD picture signal are also processed in this embodiment is as follows.

The input level standard signal Sst is not interposed in a HD picture signal obtained as an output signal of a high-vision camera currently utilized. Also, the input level standard signal Sst is necessarily not interposed in all types of HD picture signals. Therefore, it is required to suppose that a HD picture signal in which the input level standard signal Sst is interposed and the non-interposed HD picture signal are supplied to a high-vision apparatus.

Figure 8:
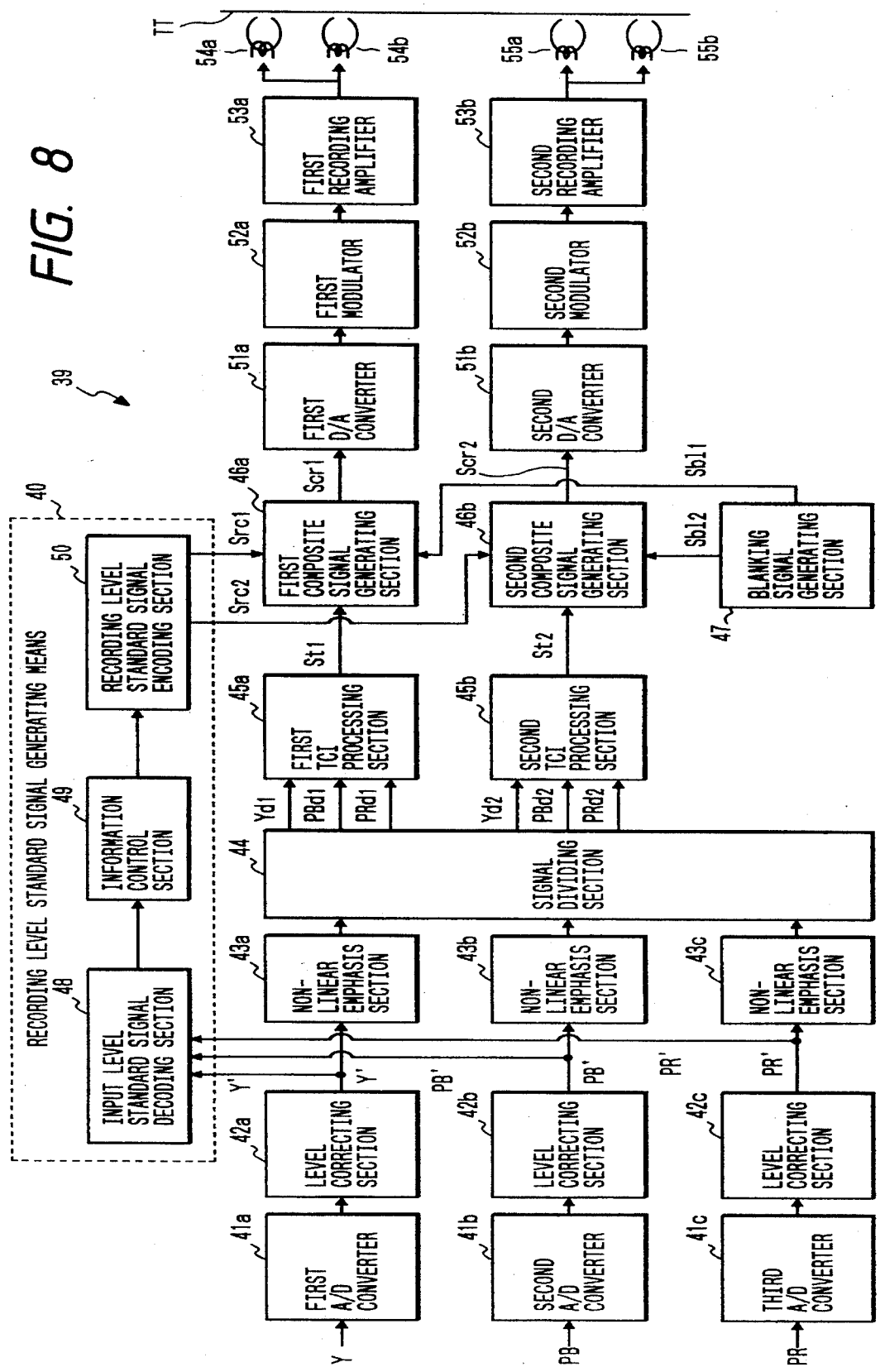
FIG. 8 is a block diagram of a high-definition picture signal recording system in a high-definition picture signal recording/reproducing apparatus according to a first embodiment of the present invention.

FIG. 8 is a block diagram of a high-definition picture signal recording system in a high-definition picture signal recording/reproducing apparatus according to a first embodiment.

A luminance signal Y, a first color difference signal PB and a second color difference signal PR are supplied to a clamping section (not shown), and pedestal levels (0%) of horizontal synchronizing signals in the signals Y, PB and PR are clamped. The signals Y, PB and PR are respectively equivalent to the output HD picture signal Sout in which the input level standard signal Sst shown in FIG. 6A or 6B is added to the 603-line or the 604-line or the non-interpolated HD picture signal. Thereafter, as shown in FIG. 8, in a high-definition picture signal recording system 39, the signals Y, PB and PR are converted to digital signals in analog-to-digital converters 41A, 41B, 41C. Thereafter, amplitude levels of the signals Y, PB and PR are corrected to normal amplitude levels in level correcting sections 42a, 42B, 42C. In detail, in cases where the input level standard signal Sst shown in FIG. 6A or FIG. 6B is added to the 603-line, an amplitude level correction is performed according to the input level standard signal Sst added to the 603-line. In cases where the input level standard signal Sst is added to the 604-line on condition that the input level standard signal Sst is not added to the 603-line, an amplitude level correction is performed according to the input level standard signal Sst added to the 604-line. In cases where the input level standard signal Sst is not added to the 603-line or the 604-line, an amplitude level correction is performed according to the horizontal synchronizing signals of each of the signals Y, PB and PR. The operation in each of the level correcting sections 42a, 42B, 42C are described in detail.

Figure 9:
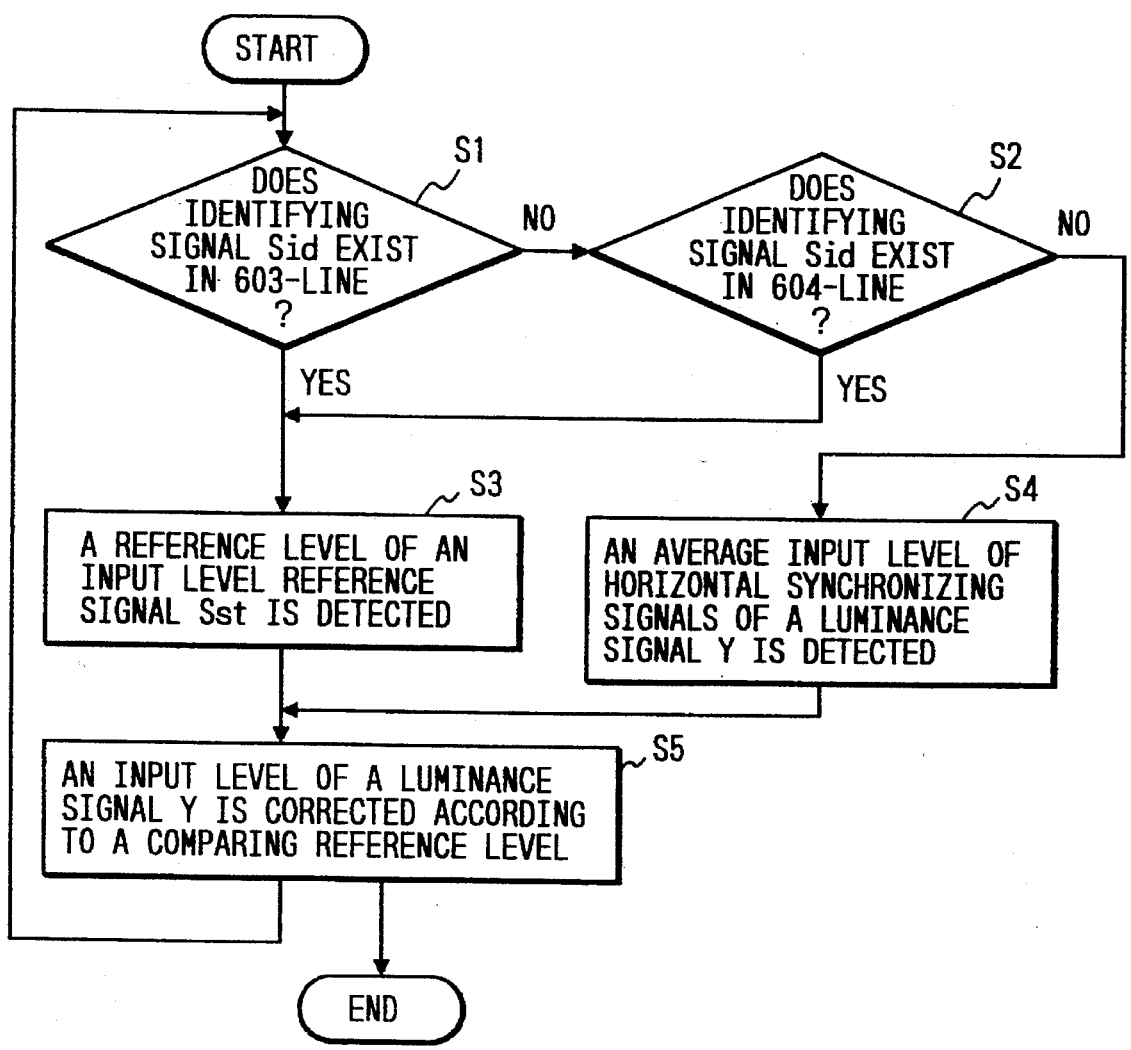
FIG. 9 shows a flow chart showing the procedure in level correcting sections 42a, 42B, 42C shown in FIG. 8.

FIG. 9 shows a flow chart showing the procedure in the level correcting sections 42a, 42B, 42C.

As shown in FIG. 9, it is judged in a step S1 whether or not the identifying signal Sid of the input level standard signal Sst exists in the 603-line. In other words, it is judged whether or not the input level standard signal Sst is added to the 603-line. In cases where the identifying signal Sid is detected in the 603-line, the procedure proceeds to a step S3. In cases where any identifying signal Sid is not detected in the 603-line, the procedure proceeds to a step S2. In the step S2, it is judged whether or not the identifying signal Sid of the input level standard signal Sst exists in the 604-line. In other words, it is judged whether or not the input level standard signal Sst is added to the 604-line. The detail of the procedure performed in the steps S1, S2 is described with reference to FIGS. 10 to 11.

Figure 10:
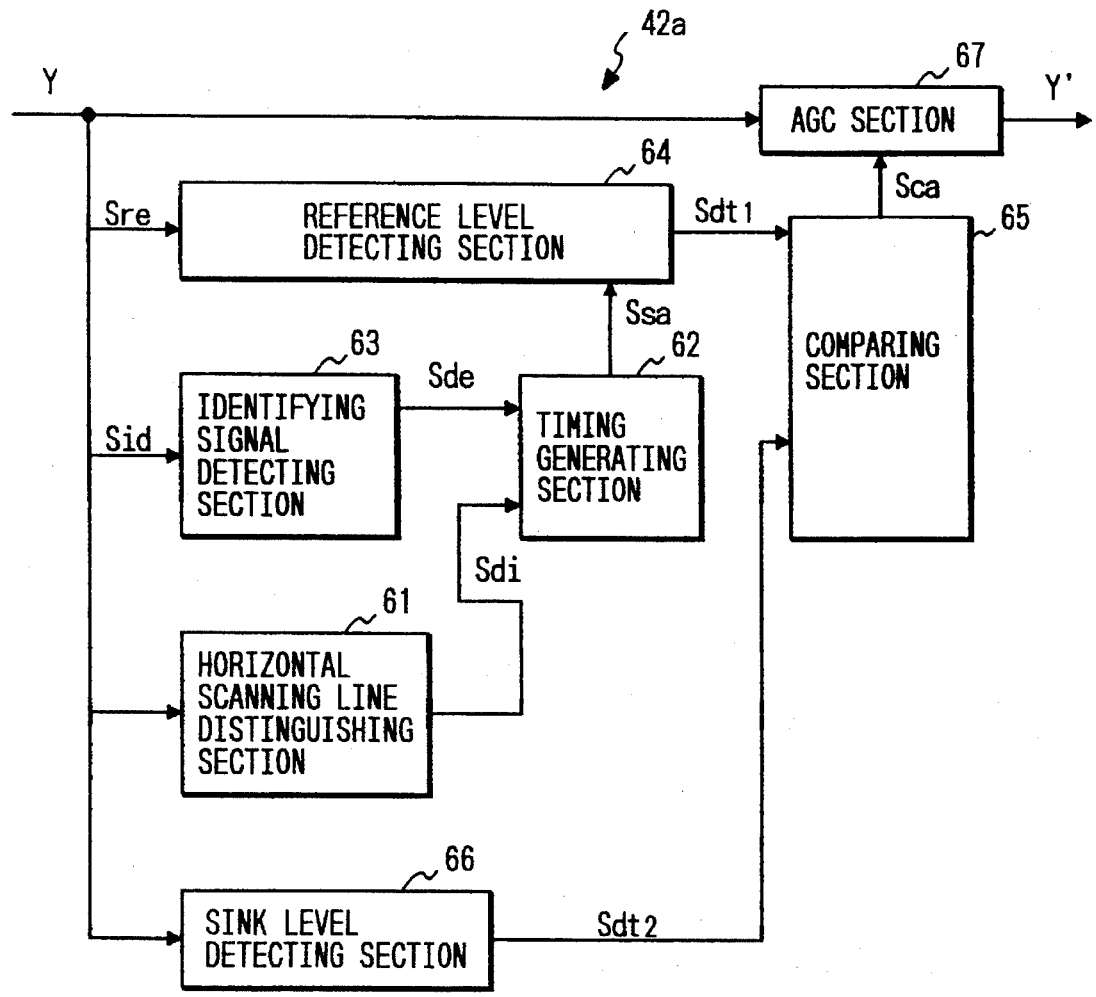
FIG. 10 shows a block diagram of level correcting sections 42a shown in FIG. 8 in which the procedure shown in FIG. 9 are performed.

FIG. 10 shows a block diagram of the level correcting sections 42a in which the procedure shown in FIG. 9 are performed.

As shown in FIG. 10, in a horizontal scanning line distinguishing section 61 of the level correcting sections 42a, vertical synchronizing signals and horizontal synchronizing signals in the luminance signal Y are detected, and the number of horizontal synchronizing signals is counted to distinguish the 603-line and the 604-line after a vertical synchronizing signal in an odd field is started. Thereafter, a horizontal scanning line distinguishing signal Sdi set to a high level in periods of the 603-line and the 604-line is sent from the horizontal scanning line distinguishing section 61 to a timing generating section 62. Also, the identifying signal Sid of the input level standard signal Sst added to the 603-line or the 604-line of the luminance signal Y is detected in an identifying signal detecting section 63, and a detecting signal Sde is sent to the timing generating section 62. The detecting signal Sde is set to a high level in a detecting period that the identifying signal Sid interpolated in the luminance signal Y is detected. Thereafter, in the timing generating section 62, a sample signal Ssa is set to a high level in a high level period that the distinguishing signal Sdi and the detecting signal Sde are respectively set to the high level, and the sample signal Ssa is sent to a reference level detecting section 64.

Returning to FIG. 9, in cases where the identifying signal Sid of the input level standard signal Sst added to the 604-line is detected in the step: S2, the procedure proceeds to the step S3. In cases where any identifying signal Sid added to the 604-line is not detected in the step S2, the procedure proceeds to a step S4. In the step S3, because the input level standard signal Sst is added to the 603-line or the 604-line, a reference level of the input level reference signal Sre multiplexed in the input level standard signal Sst is detected. In detail, as shown in FIG. 10, the input level reference signal Sre of the input level standard signal Sst interposed in the luminance signal Y is detected with the sample signal Ssa and is held in the reference level detecting section 64 according to a sample-hold process. Thereafter, a first level detecting signal Sdt1 having a reference level which agrees with the reference level of the input level reference signal Sre is formed. The first level detecting signal Sdt1 is sent to a comparing section 65.

Returning to FIG. 9, in the step S4, because an input level standard signal Sst is not added to the 603-line or the 604-line, an average amplitude level of the horizontal synchronizing signals of the luminance signal Y is detected and converted to a reference level. That is, as shown in FIG. 10, the average amplitude level of the horizontal synchronizing signals is detected in a sink level detecting section 66. A detecting method for detecting the average amplitude level of the horizontal synchronizing signals is described in detail with reference to FIG. 11A.

Figure 11A:
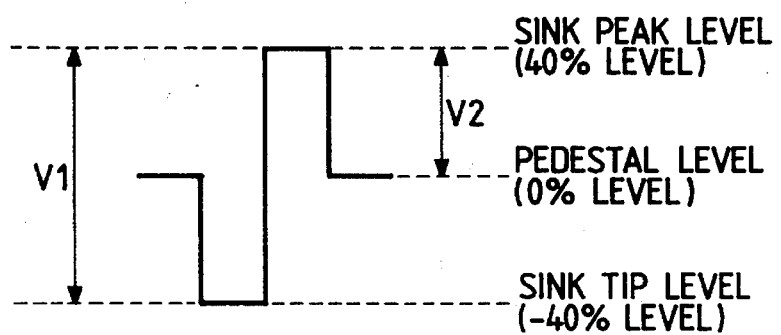
FIG. 11A shows a waveform of a ternary-value type of horizontal synchronizing signal.

FIG. 11A shows a waveform of a ternary-value type of horizontal synchronizing signal.

As shown in FIG. 11A, each of the horizontal synchronizing signals has a sink peak level of 40%, a pedestal level of 0% and a sink tip level of −40%. Therefore, a first level difference V1 between the sink peak level and the sink tip level is detected as an amplitude level of a horizontal synchronizing signal according to a first detecting method, and a second level difference V2 between the sink peak level and the pedestal level is detected as another amplitude level of a horizontal synchronizing signal according to a second detecting method. In the first embodiment, because a dynamic range in the level correcting sections 42a is substantially enlarged by shifting the dynamic range in a direction of the sink peak level, the second detecting method in which the second level difference V2 of 40% is detected as the amplitude level of the horizontal synchronizing signal is adopted. Therefore, the second level difference V2 of 40% is converted to a reference level Lr of 75% according to an equation (4).

$$Lr = V2*2-5 \qquad (4)$$

Thereafter, the reference levels of the horizontal synchronizing signals are averaged to newly form a reference level, and a second level detecting signal Sdt2 having the reference level is sent from the sink level detecting section 66 to the comparing section 65.

After the reference level is obtained in the step S3 or the step S4, as shown in FIG. 9, the procedure proceeds to a step S5, and an amplitude level of the luminance signal Y is corrected according to a comparing reference level. In detail, as shown in FIG. 10, the reference level of either the first level detecting signal Sdt1 or the second level detecting signal Sdt2 sent to the comparing section 65 are compared with a comparing reference level of 75% which is stored in the comparing section 65 in advance. In cases where the reference level of the first or second level detecting signal Sdt1 or Sdt2 is lower than the comparing reference level, an input level control signal Sca is sent to an automatic gain control (AGC) section 67 to decrease the amplitude level of the luminance signal Y. In contrast, in cases where the reference level of the first or second level detecting signal Sdt1 or Sdt2 is higher than the comparing reference level, another input level control signal Sca is sent to the AGC section 67 to increase the amplitude level of the luminance signal Y. In the AGC section 67, the amplitude level of the luminance signal Y is corrected according to the input level control signal Sca to form a corrected luminance signal Y', and the corrected luminance signal Y' is output.

Therefore, in cases where the amplitude level of the luminance signal Y is corrected in the level correcting sections 42a, the detection of the input level standard signal Sst added to the 603-line is performed prior to the detection of the input level standard signal Sst added to the 604-line, and the amplitude level of the luminance signal Y is corrected according to the input level standard signal Sst added to the 603-line. In cases where the input level standard signal Sst is not added to the 603-line, the detection of the input level standard signal Sst added to the 604-line is performed prior to the detection of an average amplitude level of the horizontal synchronizing signals in the luminance signal Y, and the amplitude level of the luminance signal Y is corrected according to the input level standard signal Sst added to the 604-line. In cases where the input level standard signal Sst is not added to the 603-line or the 604-line, the amplitude level of the luminance signal Y is corrected according to the average amplitude level of the horizontal synchronizing signals of the luminance signal Y.

Figure 11B:
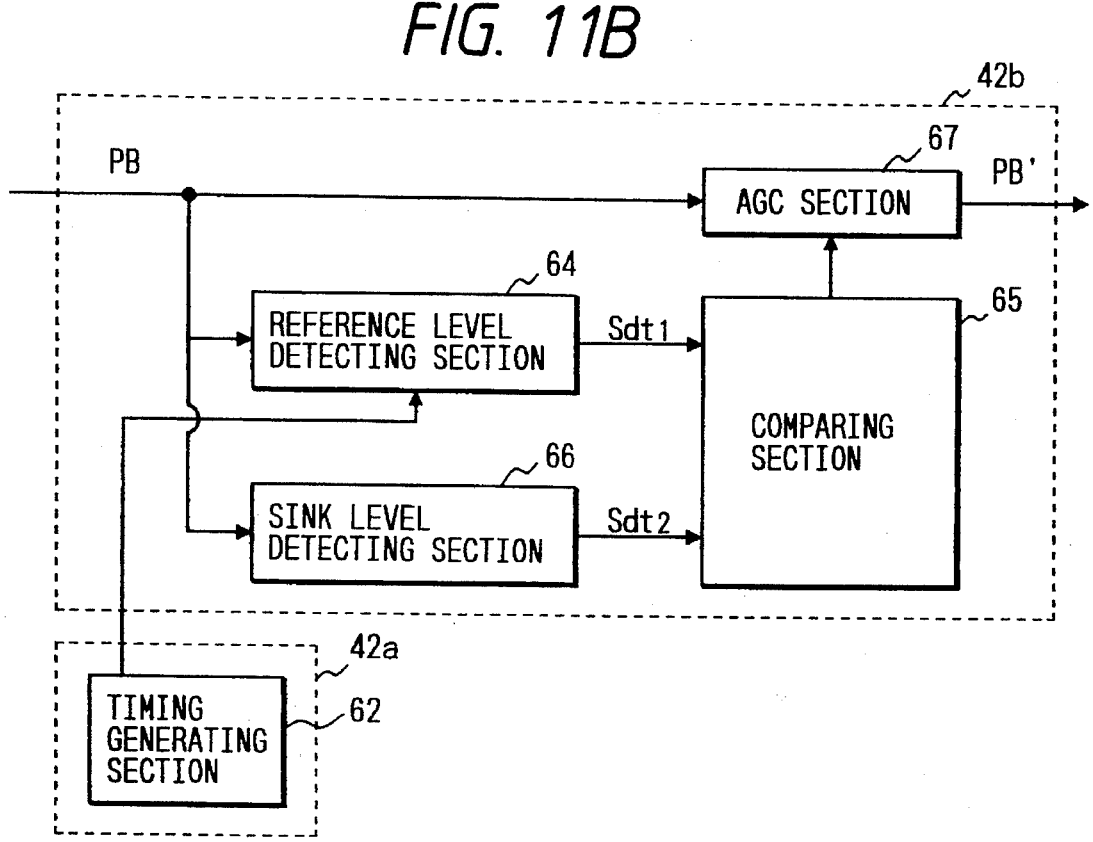
FIG. 11B shows a block diagram of level correcting sections 42b shown in FIG. 8 in which the procedure shown in FIG. 9 are performed.
Figure 11C:
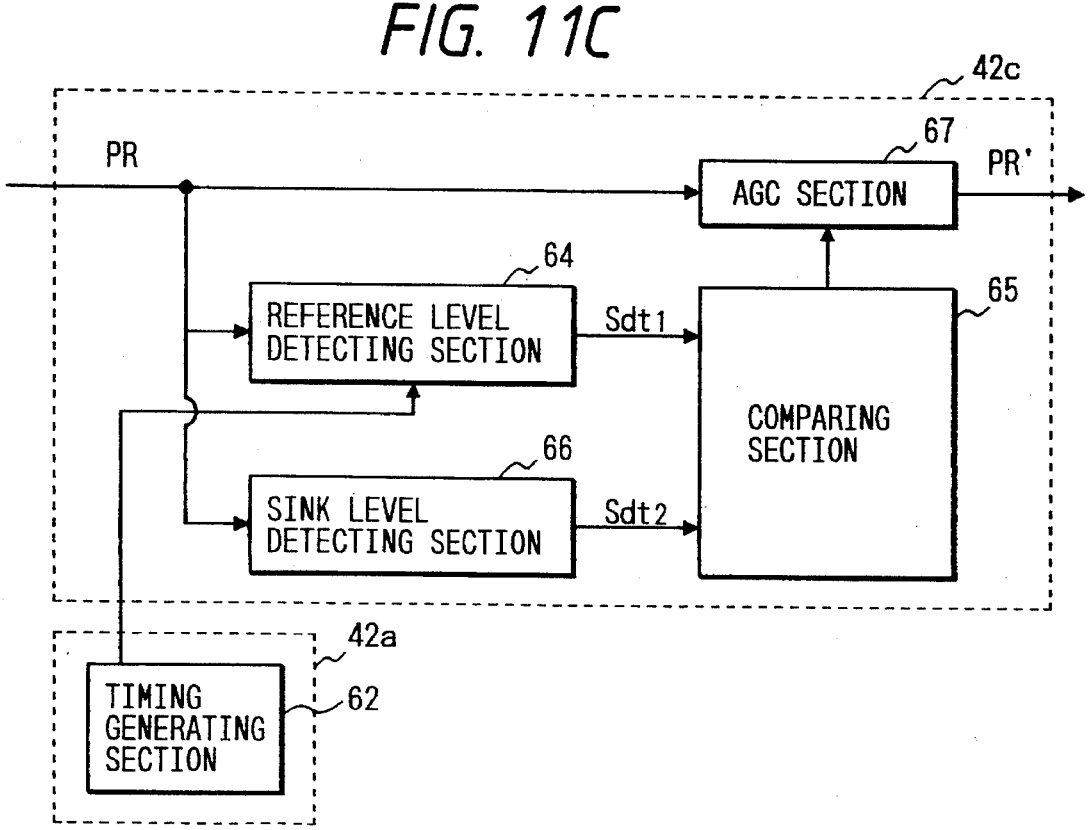
FIG. 11C shows a block diagram of level correcting sections 42c shown in FIG. 8 in which the procedure shown in FIG. 9 are performed.

In the same manner, the amplitude level of the first color difference signal PB is corrected in the level correcting section 42b, and a corrected first color difference signal PB' having a corrected amplitude level is formed. Also, the amplitude level of the second color difference signal PR is corrected in the level correcting section 42c, and a corrected second color difference signal PR' having a corrected amplitude level is formed. However, any identifying signal is not multiplexed in the input level standard signals Sst interposed in the first and second color difference signals PB, PR. Also, the number of the horizontal scanning line to which the input level standard signal Sst interposed in each of the first and second color difference signals PB, PR is added is the same as that of the horizontal scanning line to which the input level standard signal Sst interposed in the luminance signal Y is added. Therefore, as shown in FIGS. 11B, 11C, each of the level correcting sections 42b, 42c comprises the reference level detecting section 64, the comparing section 65, the sink level detecting section 66 and the AGC section 67. That is, the: sample signal Ssa formed in the horizontal scanning line distinguishing section 61, the timing generating section 62 and the identifying signal detecting section 63 of the level correcting section 42a is sent to the level correcting sections 42b, 42c.

In the first embodiment, the HD picture signal in which the input level standard signal Sst is added to the 603-line or the 604-line are utilized. However, it is not limited to the 603-line and the 604-line. That is, it is applicable that the HD picture signal in which the input level standard signal Sst is added to the 41 line or the 42 line be utilized. In this case, the detection of the input level standard signal Sst added to the 41 line is performed prior to the detection of of the input level standard signal Sst added to the 42 line.

Also, it is applicable that the HD picture signal in which the input level standard signal Sst is interposed in a series of lines ranging from the 603-line to the 628-line be utilized. In this case, the input level standard signal Sst added to a horizontal scanning line numberred by a lower number has priority to be detected.

Also, the input level standard signals Sst shown in FIGS. 6A, 6B are utilized. However, it is applicable that the input level standard signal Sst shown in FIG. 2B or FIG. 5B be utilized.

Next, another level correcting section according to a modification of the first embodiment is described.

Figure 12:
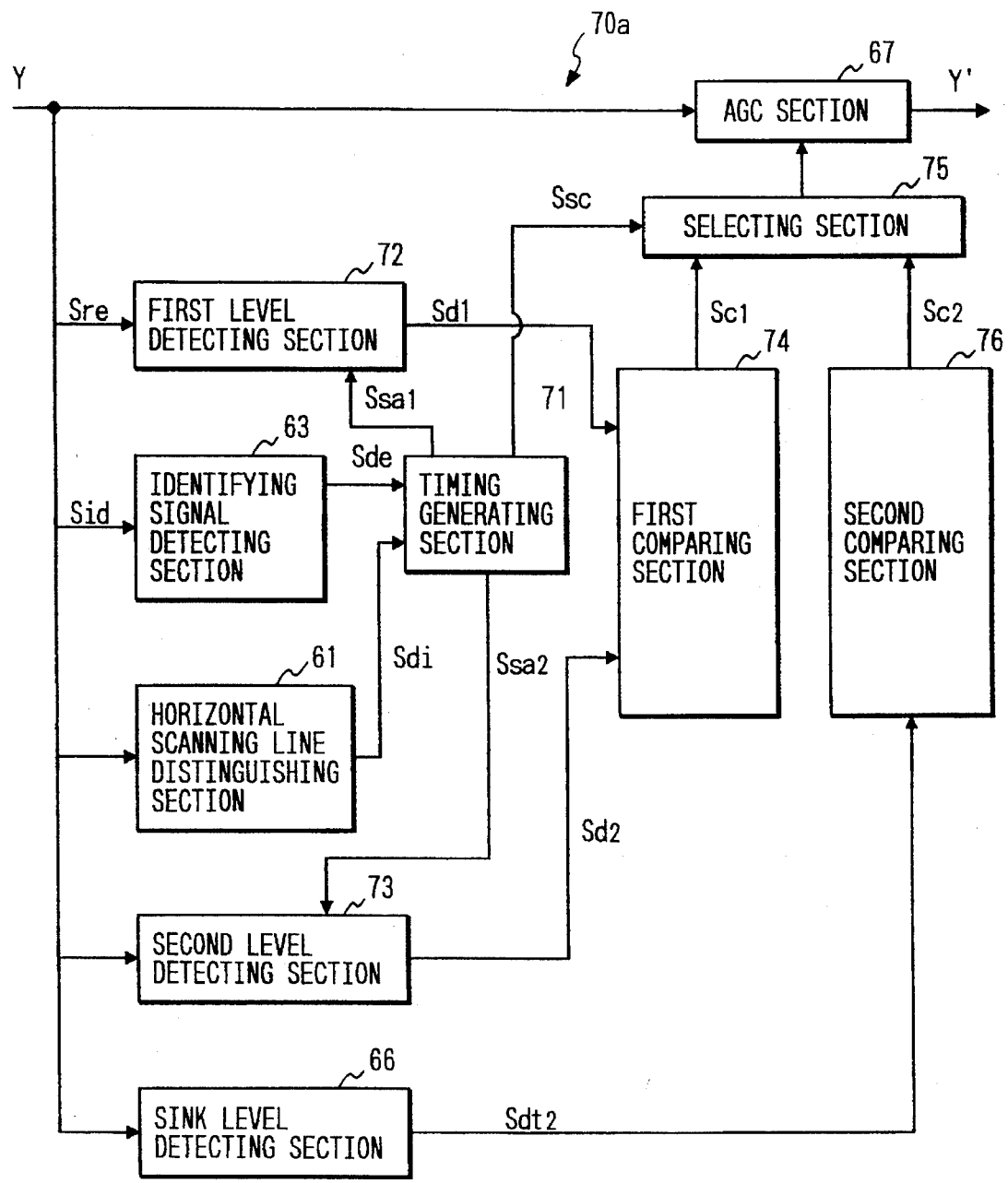
FIG. 12 shows a block diagram of a level correcting section pertaining to a luminance signal Y according to a modification of the first embodiment.
Figure 13:
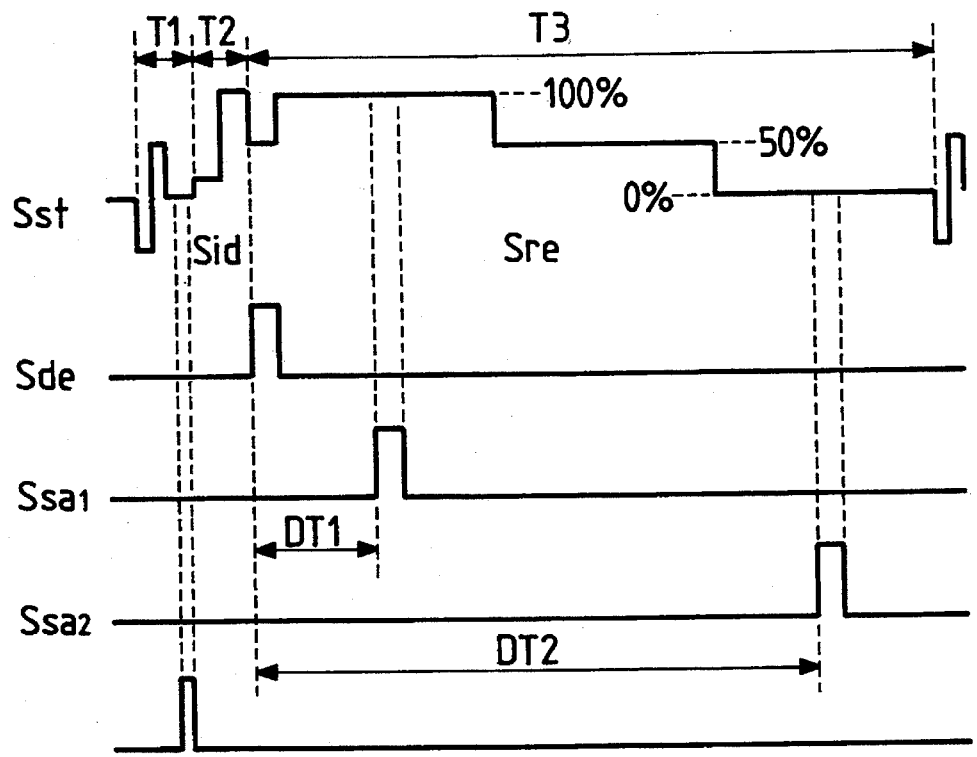
FIG. 13 is a timing chart of various signals processed in the level correcting section shown in FIG. 12.

FIG. 12 shows a block diagram of a level correcting section according to a modification of the first embodiment, the input level standard signal Sst shown in FIG. 2B being added to the 603-line or the 604-line. FIG. 13 is a timing chart of various signals processed in the level correcting section shown in FIG. 12.

As shown in FIGS. 12, 13, the amplitude level of the luminance signal Y is corrected in a level correcting section 70a. That is, the horizontal scanning line distinguishing signal Sdi generated in the distinguishing section 61 and the detecting signal Sde generated in the detecting section 63 are sent to a timing generating section 71. In the timing generating section 71, in cases where the detecting signal Sde is set to a high level in a period that the horizontal scanning line distinguishing signal Sdi is set to a high level, the detecting signal Sde is delayed by a first delaying time DT1 to form a first sampling signal Ssa1 and is delayed by a second delaying time DT2 to form a second sampling signal Ssa2. The first sampling signal Ssa1 is sent to a first level detecting section 72, and the second sampling signal Ssa2 is sent to a second level detecting section 73. Thereafter, a first amplitude level 100% of the input level reference signal Sre is sampled in a period that the first sampling signal Ssa1 is set to a high level, and a first level detecting signal Sd1 having a first amplitude level of 100% is sent to a first comparing section 74. Also, a second amplitude level 0% of the input level reference signal Sre is sampled in a period that the second sampling signal Ssa2 is set to a high level, and a second level detecting signal Sd2 having a second amplitude level of 0% is sent to the first comparing section 74. In the first comparing section 74, an amplitude level difference between the first and second amplitude levels is calculated, and a comparing reference level stored in the first comparing section 74 in advance is compared with the amplitude level difference. Thereafter, a first level control signal Sc1 is formed according to a first compared difference between the comparing reference level and the amplitude level difference. That is, a reference level of the first level control signal Sc1 is equal to the first compared difference. The first level control signal Sc1 is sent to a selecting section 75.

Also, the second level detecting signal Sdt2 generated in the sink level detecting section 66 is sent to a second comparing section 76. In the second comparing section 76, the reference level of the second level detecting signal Sdt2 is compared with a reference sink level stored in the second comparing section 76 in advance. Thereafter, a second level control signal Sc2 is formed according to a second compared difference between the reference sink level and the reference level of the second level detecting signal Sdt2. That is, a reference level of the second level control signal Sc2 is equal to the second compared difference. The second level control signal Sc2 is sent to the selecting section 75. In the selecting section 75, the first level control signal Sc1 is selected in cases where the input level standard signal Sst is added to the 603-line or the 604-line. Also, the second level control signal Sc2 is selected in cases where the input level standard signal Sst is not added to the 603-line or the 604-line. The selection of the first or second level control signal Sc1 or Sc2 is performed under control of a selection controlling signal Ssc generated in the timing generating section 71.

The procedure of the generation of the selection controlling signal Ssc is described with reference to FIGS. 14, 15.

Figure 14:
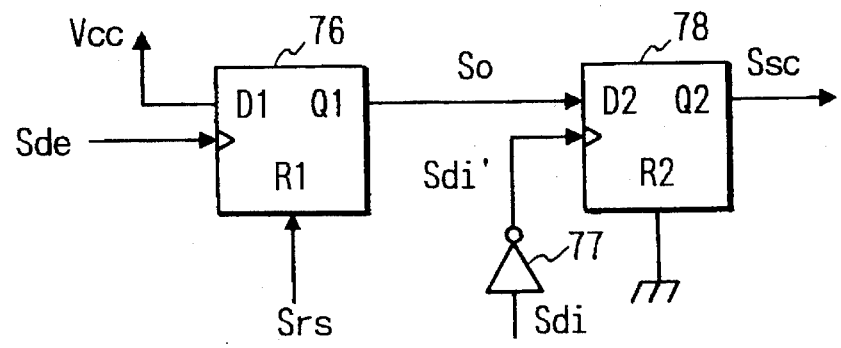
FIG. 14 is a block diagram of a part of a timing generating section shown in FIG. 12 in which a selection controlling signal Ssc is generated.
Figure 15A:
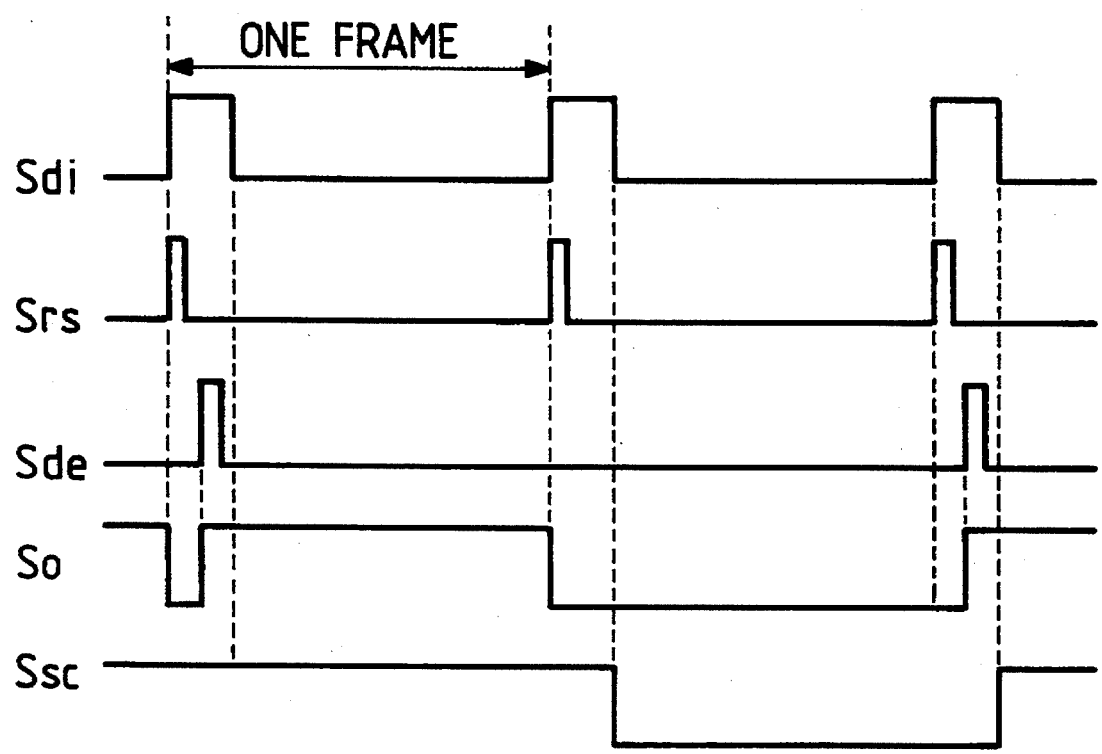
FIG. 15A is a timing chart of various signals processed in a timing generating section shown in FIG. 14.

FIG. 14 is a block diagram of a part of the timing generating section 71 in which the selection controlling signal Ssc is generated. FIG. 15A is a timing chart of various signals processed in the timing generating section 71 shown in FIG. 14.

As shown in FIGS. 14, 15A, the timing generating section 71 comprises a first D flip-flop 76 receiving a reset signal Srs and the detecting signal Sde, an inverter 77 for inverting the horizontal scanning line distinguishing signal Sdi to form an inverted distinguishing signal Sdi', and a second D flip-flop 78 receiving an output signal So of the first D flip-flop 76 and the inverted distinguishing signal Sdi'.

In the above configuration, the reset signal Srs formed by detecting leading edges of the horizontal scanning line distinguishing signal Sdi is sent to a reset terminal R1 of the first D flip-flop 76. Because the distinguishing signal Sdi is set to a high level in a period corresponding to the 603-line and 604-line, the reset signal Srs is set to a high level in a starting point of the 603-line. Also, the detecting signal Sde is sent to a clock terminal of the first D flip-flop 76. Therefore, the output signal So of the first D flip-flop 76 is sent to a data terminal D2 of the second D flip-flop 78. Also, the horizontal scanning line distinguishing signal Sdi is inverted in the inverter 77, and the inverted distinguishing signal Sdi' is sent to a clock terminal of the second D flip-flop 78. Therefore, the selection controlling signal Ssc is output from the second D flip-flop 78.

In the selecting section 75 shown in FIG. 12, the first level control signal Sc1 is selected in a period that the selection controlling signal Ssc is set to a high level, and the second level control signal Sc2 is selected in a period that the selection controlling signal Ssc is set to a low level. Thereafter, the first or second level control signal Sc1 or Sc2 is sent to the AGC section 67 to correct the amplitude level of the luminance signal Y according to the reference level of the first or second level control signal Sc1 or Sc2.

Accordingly, in cases where the input level standard signal Sst is added to the 603-line or the 604-line, the amplitude level of the luminance signal Y can be corrected according to the input level reference signal Sre multiplexed in the input level standard signal Sst. Also, in cases where the input level standard signal Sst is not added to the 603-line or the 604-line, the amplitude level of the luminance signal Y can be corrected according to the average amplitude level of the horizontal synchronizing signals of the luminance signal Y.

Figure 15B:
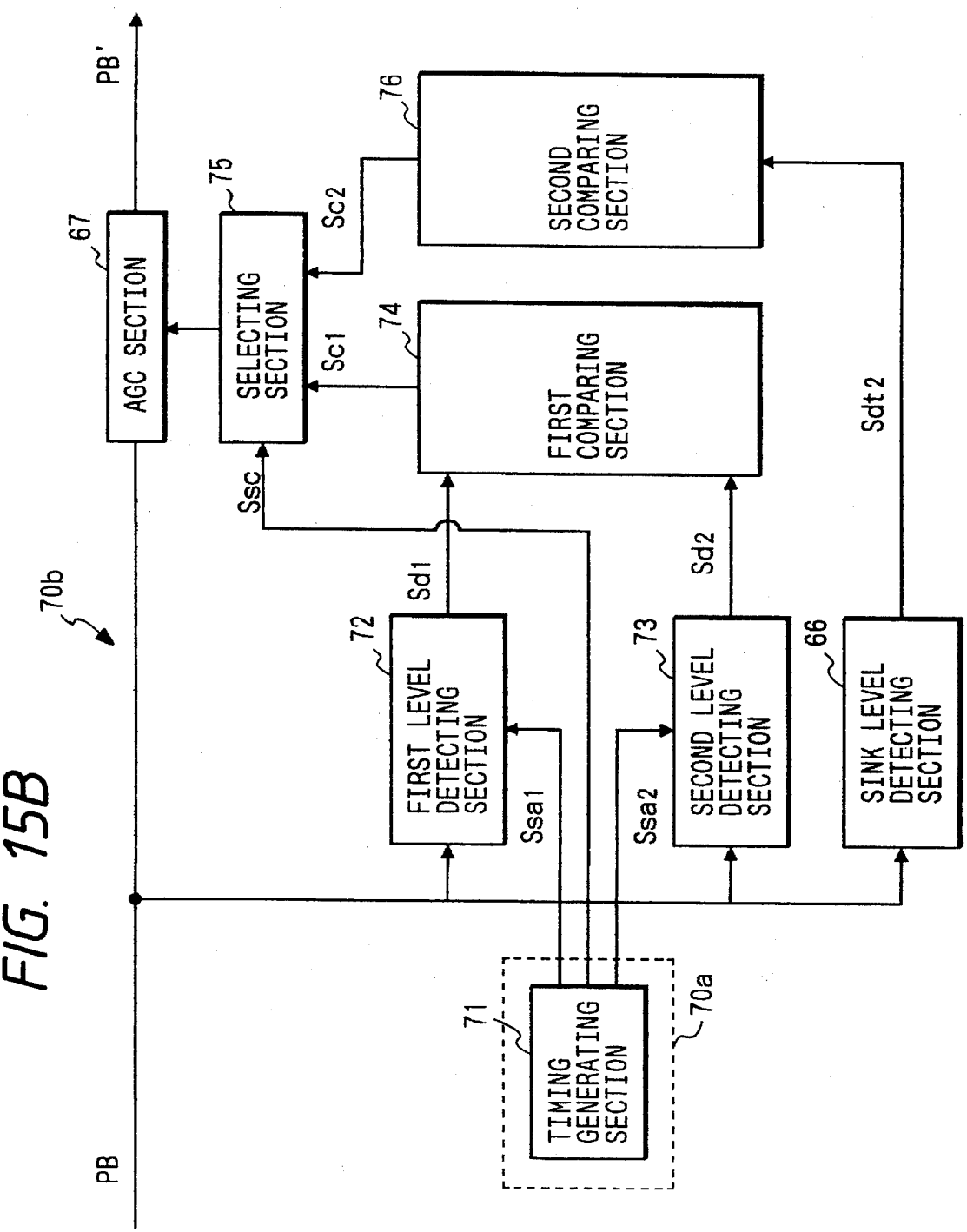
FIG. 15B shows a block diagram of a level correcting section pertaining to a first color difference signal PB according to the modification of the first embodiment.

In the same manner, the amplitude level of the first color difference signal PB is corrected in a level correcting section 70b shown in FIG. 15B, and a corrected first color difference signal PB' having a corrected amplitude level is formed. Also, the amplitude level of the second color difference signal PR is corrected in the level correcting section 70c shown in FIG. 15C, and a corrected second color difference signal PR' having a corrected amplitude level is formed.

In the above embodiment, the input level standard signal Sst shown in FIG. 2B is utilized. However, it is applicable that the input level standard signal Sst shown in FIG. 5A be utilized.

Returning to FIG. 8, the corrected luminance signal Y', the corrected first color difference signal PB' and the corrected second color difference signal PR' of which amplitude levels are corrected to normal amplitude levels in the level correcting sections 42a, 42b and 42c (or 70a, 70b and 70c) are sent to non-linear emphasis sections 43a, 43b and 43c and a recording level standard signal generating means 40.

In the non-linear emphasis sections 43a, 43b and 43c, high frequency components of the corrected signals Y', PB' and PR' are emphasized as compared with low frequency components of the corrected signals Y', PB' and PR'. The reason that the high frequency components of the corrected signals Y', PB' and PR' are emphasized after the amplitude levels of the signals Y, PB and PR are corrected in the level correcting sections 42a, 42b and 42c is that operational characteristics in the non-linear emphasis sections 43a, 43b and 43c vary according to amplitude levels of signals input to the sections 43a, 43b and 43c. Thereafter, each of the corrected signals Y', PB' and PR' emphasized is transferred to a signal dividing section 44. In this case, each of the corrected signals Y', PB' and PR' is composed of a plurality of line signals allocated to a plurality of horizontal scanning lines (shown in FIG. 3) other than the particular horizontal scanning line (that is, the 603-line or the 604-line) and the input level standard signal Sst added to the particular horizontal scanning line. In the signal dividing section 44, a part of line signals allocated to peripheral horizontal scanning lines placed at upper and lower peripheral portions of an image plane are deleted to decrease a volume of the line signals recorded in a recording medium such as a magnetic tape. For example, in cases where the 603-line is utilized as the particular horizontal scanning line, a first group of line signals allocated at the 1-line to the 41-line, a second group of line signals allocated at the 558-line to 602-line and the input level standard signal Sst added to the particular horizontal scanning line (that is, the 603-line) are deleted according to a MUSE standard in Japan. Thereafter, each of the corrected signals Y', PB' and PR' is divided into a first signal and a second signal in the signal dividing section 44 to record the corrected signals Y', PB' and PR' in a magnetic tape according to a two-track parallel recording. A dividing processing in the signal dividing section 44 is described in detail with reference to FIG. 16.

Figure 16:
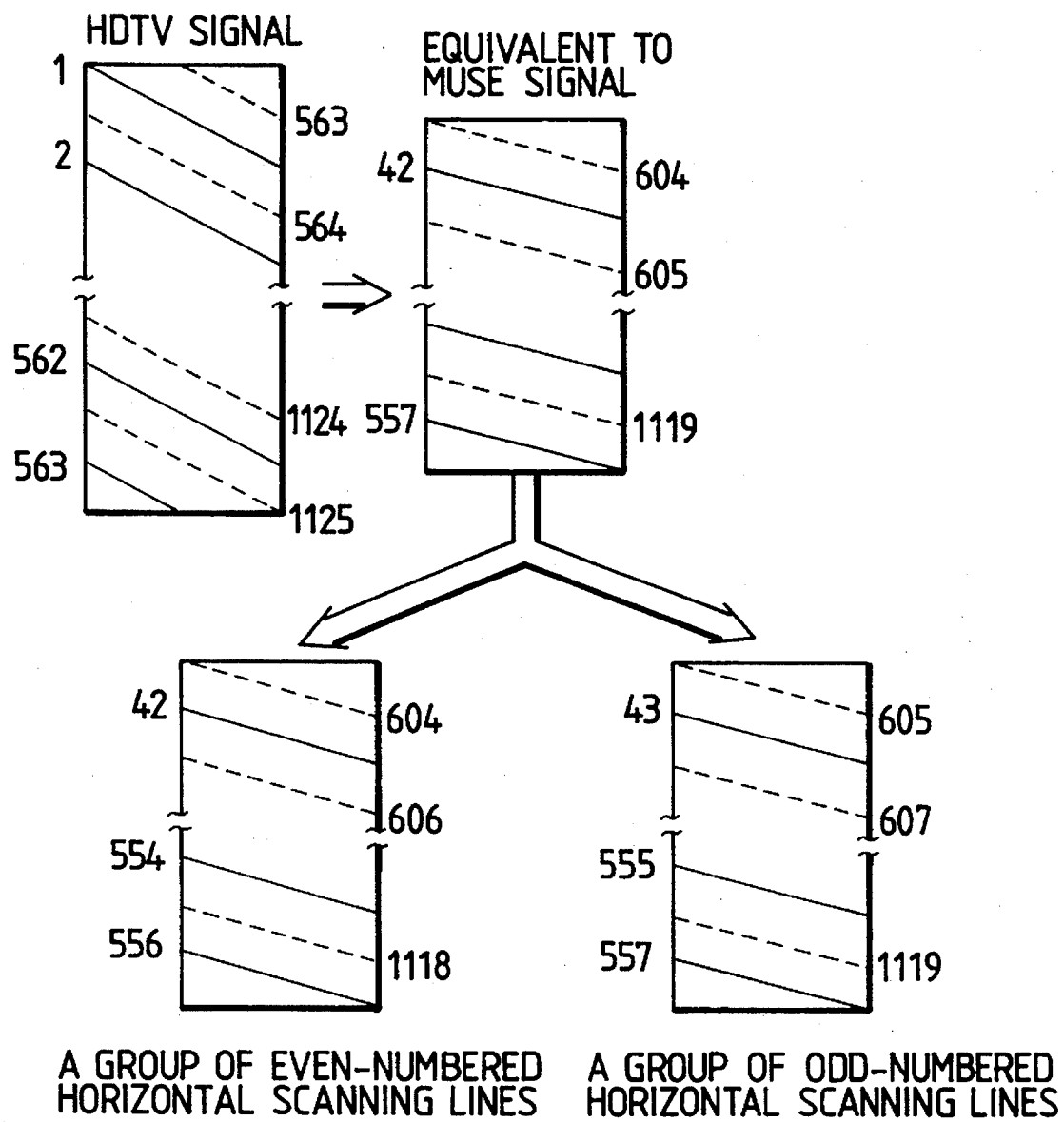
FIG. 16 conceptually shows horizontal scanning lines in a high-definition television (HDTV) signal, horizontal scanning lines in a line reduced signal equivalent to a MUSE signal, even-numbered horizontal scanning lines in the line reduced signal and odd-numbered horizontal scanning lines in the line reduced signal.

FIG. 16 conceptually shows horizontal scanning lines in a high-definition television (HDTV) signal, horizontal scanning lines in a line reduced signal equivalent to a MUSE signal, even-numbered horizontal scanning lines in the line reduced signal and odd-numbered horizontal scanning lines in the line reduced signal.

As shown in FIG. 16, because the corrected signals Y', PB' and PR' emphasized is a high-definition television (HDTV) signal, the number of horizontal scanning lines provided in each of frames is 1125. In the signal dividing section 44, a plurality of horizontal scanning lines pertaining to the synchronizing signal and upper and lower sides of an image plane are omitted from each of the corrected signals Y', PB' and PR' emphasized to form a line reduced signal equivalent to a MUSE signal. In the line reduced signal, the number of horizontal scanning lines provided in each of frames is 1032, and the horizontal horizontal scanning lines of the line reduced signal are positioned in a first range from the 42line to the 557-line and a second range from the 604-line to the 1119-line. Thereafter, the horizontal horizontal scanning lines of the line reduced signal are divided into a group of even-numbered horizontal scanning lines and a group of odd-numbered horizontal scanning lines. Therefore, the corrected luminance signal Y' emphasized is divided into a first Y signal Yd1 pertaining to the even-numbered horizontal scanning lines and a second Y signal Yd2 pertaining to the odd-numbered horizontal scanning lines, the corrected first color difference signal PB' emphasized is divided into a first PB signal PBd1 pertaining to the even-numbered horizontal scanning lines and a second PB signal PBd2 pertaining to the odd-numbered horizontal scanning lines, and the corrected second color difference signal PR' emphasized is divided into a first PR signal PRd1 pertaining to the even-numbered horizontal scanning lines and a second PR signal PRd2 pertaining to the odd-numbered horizontal scanning lines. The first Y signal Yd1, the first PB signal PBd1 and the first PR signal PRd1 are transferred to a first time compressed integration (TCI)

processing section 45a, and the second Y signal Yd2, the second PB signal, PBd2 and the second PR signal PRd2 are transferred to a second TCI processing section 45b.

In the first TCI processing section 45a, the first PB signal PBd1 and the first PR signal PRd1 are combined with each other to form a first line-order chromaticity signal, and the first line-order chromaticity signal is compressed in point of time to form a first compressed line-order chromaticity signal. Also, the first Y signal Yd1 is compressed in point of time to form a first compressed luminance signal. Thereafter, the first compressed line-order chromaticity signal and the first compressed luminance signal are multiplexed with each other to form a first TCI signal St1. The first TCI signal St1 is transferred to a first composite signal generating section 46a. In the second TCI processing section 45b, the second PB signal PBd2 and the second PR signal PRd2 are combined with each other to form a second line-order chromaticity signal, and the second line-order chromaticity signal is compressed in point of time to form a second compressed line-order chromaticity signal. Also, the second Y signal Yd2 is compressed in point of time to form a second compressed luminance signal. Thereafter, the second compressed line-order chromaticity signal and the second compressed luminance signal are multiplexed with each other to form a second TCI signal St2. The second TCI signal St2 is transferred to a second composite signal generating section 46b.

In the first composite signal generating section 46a, a first recording level standard signal Src1 generated in the recording level standard signal generating means 40 and a first blanking signal Sbl1 generated in a blanking signal generating section 47 are interposed in the first TCI signal St1 to add the first recording level standard signal Src1 and the first blanking signal Sbl1 to first horizontal scanning lines between the 1118-line of a preceding frame and the 42-line and second horizontal scanning lines between the 556-line to the 604-line. Therefore, a first composite recording signal Scr1 having a recording level is generated in the first composite signal generating section 46a. Also, a second recording level standard signal Src2 generated in the recording level standard signal generating means 40 and a second blanking signal Sbl2 generated in the blanking signal generating section 47 are interposed in the second TCI signal St2 to add the second recording level standard signal Src2 and the second blanking signal Sbl2 to third horizontal scanning lines between the 1119-line of a preceding frame and the 43-line and fourth horizontal scanning lines between the 557-line to the 605-line. Therefore, a second composite recording signal Scr2 having a recording level is generated in the second recording level standard signal Src2.

Figure 17A:
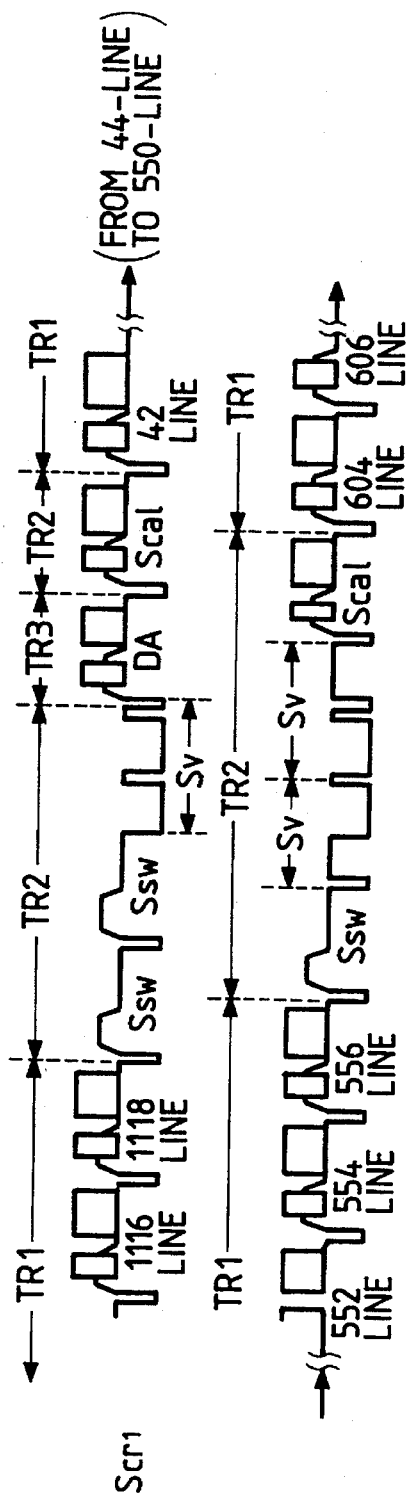
FIG. 17A shows a waveform of a first composite recording signal Scr1 generated in a first composite signal generating section shown in FIG. 8.
Figure 17B:
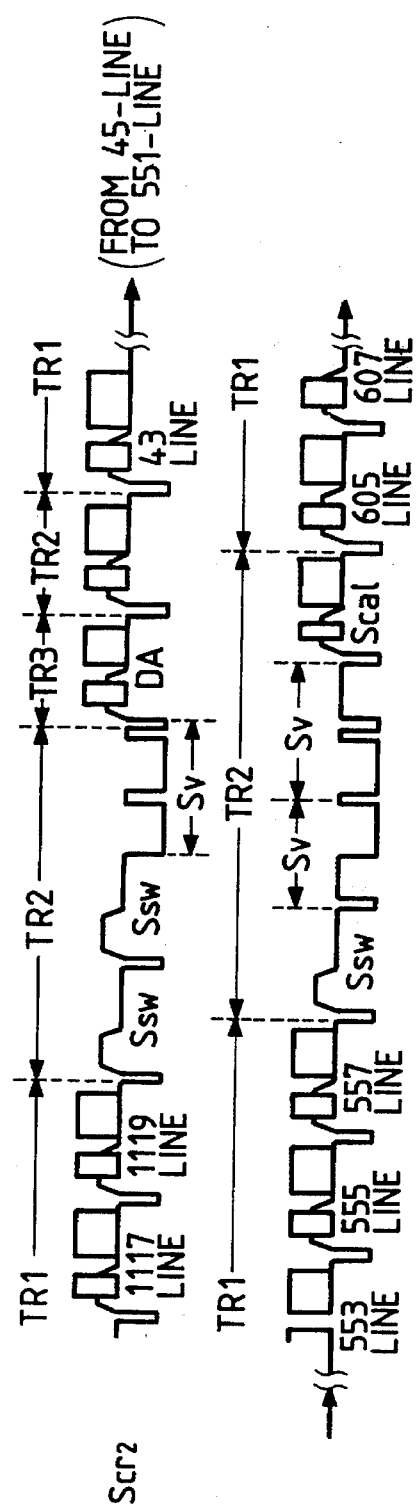
FIG. 17B shows a waveform of a second composite recording signal Scr2 generated in a second composite signal generating section shown in FIG. 8.

FIG. 17A shows a waveform of the first composite recording signal Scr1 generated in the first composite signal generating section 46a, and FIG. 17B shows a waveform of the second composite recording signal Scr2 generated in the second composite signal generating section 46b.

As shown in FIGS. 17A, 17B, the first and second TCI signals St1, St2 are respectively combined in first recording periods TR1, the first and second blanking signals Sbl1, Sbl2 are respectively combined in second recording periods TR2, and the first and second recording level standard signals Src1, Src2 are respectively combined in third recording periods TR3.

In the blanking signal generating section 47, one or more switching signals Ssw, one or more horizontal-vertical synchronizing signal Sv and a calibrating signal Sca1 are combined to form the first and second blanking signals Sbl1, Sbl2. The switching signals Ssw are utilized to make a margin for the change of a magnetic head. The calibrating signal Sca1 is a signal obtained by repeatedly replacing a signal with another signal selected from among a ramp signal for calibrating the linearity between an even-numbered system and an odd-numbered system, a gray scale signal for adjusting direct current levels between the systems and amplitude levels between the systems, a multi-burst signal for calibrating frequency characteristics between the systems, and the like.

In the recording level standard signal generating means 40, the input level standard signals Sst of the corrected signals Y', PB' and PR' shown in FIGS. 6A, 6B are respectively decoded in an input level standard signal decoding section 48 to read out pieces of prescribed information designated by the information signals Sif of the corrected signals Y', PB' and PR' and pieces of reference level information designated by the input level reference signals Sre of the corrected signals Y', PB' and PR', and the prescribed information and the reference level information are transferred to an information control section 49. In the information control section 49, the prescribed information is replaced with pieces of renewed information if necessary. Thereafter, the prescribed information or the renewed information and the reference level information are transferred to a recording level standard signal encoding section 50 as pieces of input information.

Figure 18:
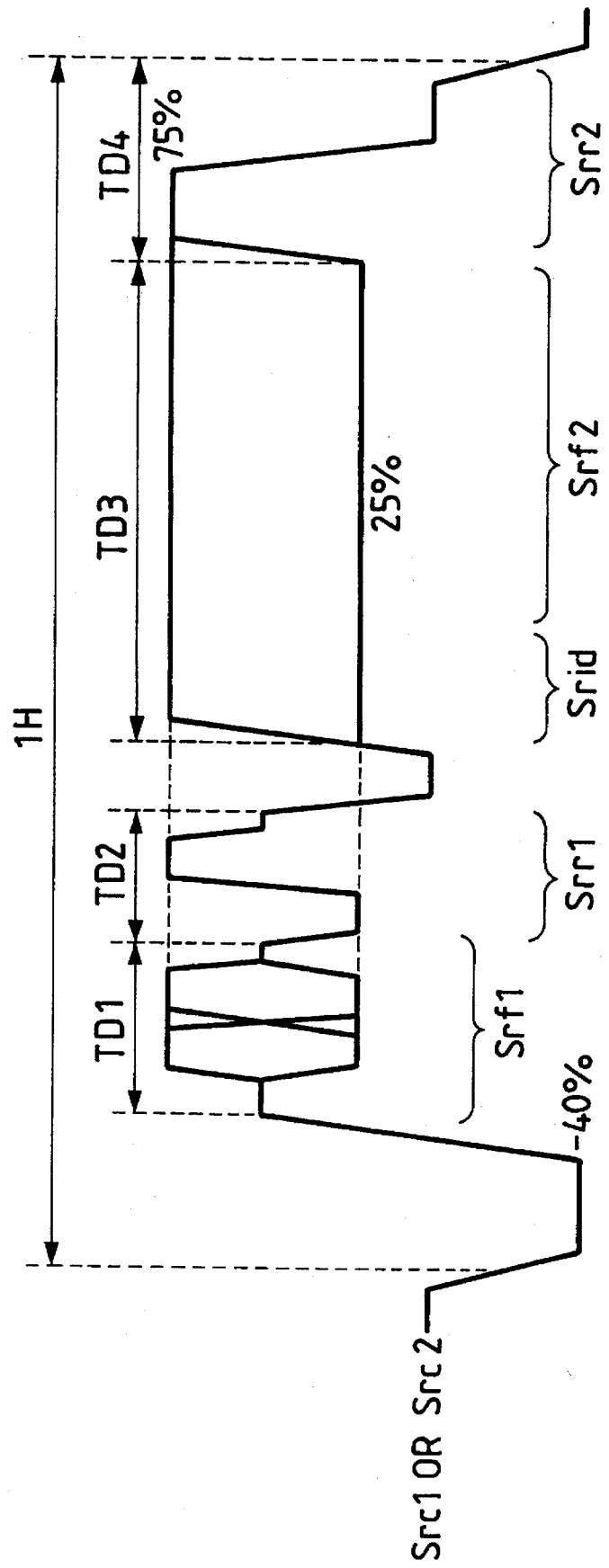
FIG. 18 shows a waveform of a recording level standard signal Src1 or Src2 generated in a recording level standard signal encoding section shown in FIG. 8.

In the recording level standard signal encoding section 50, the first and second recording level standard signals Src1, Src2 shown in FIG. 18 are generated according to the input information. In detail, each of the first and second recording level standard signals Src1, Src2 is composed of a recording information signal Srf1 compressed and combined in a first decoding period TD1, a recording level reference signal Srr1 compressed and combined in a second decoding period TD2, a recording level identifying signal Srid and a recording information signal Srf2 compressed and combined in a third decoding period TD3, and a recording level reference signal Srr2 compressed and combined in a fourth decoding period TD4. The recording information signal Srf1 indicates one or more pieces of information pertaining to the first and second color difference signals PB, PR and is formed by changing the amplitude level of the information signal Sif of the first or second color difference signal PB or PR to a recording level, the recording level reference signal Srr1 indicates amplitude levels of the first and second color difference signals PB, PR and is formed by changing the amplitude level of the input level reference signal Sre of thee first or second color difference signal PB or PR to a recording level, the recording level identifying signal Srid is formed by changing the amplitude level of the identifying signal Sid of the luminance signal Y to a recording level, the recording information signal Srf2 indicates one or more pieces of information pertaining to the luminance signal Y and is formed by changing the information signal Sif of the luminance signal Y to a recording level, and the recording level reference signal Srr2 indicates amplitude levels of the luminance signal Y and is formed by changing the amplitude level of the input level reference signal Sre of the luminance signal Y to a recording level.

In this case, the time compressibility of the recording information signals Srf1, Srf2, the recording level identifying signal Srid and the recording level reference signals Srr1, Srr2 in the first and second recording level standard signals Src1, Src2 is the same as that of a chromaticity signal and a luminance signal compressed in a picture signal in series. Therefore, a series of decoding periods TD1, TD2 in the first and second recording level standard signals Src1, Src2 agrees with a period of the chromaticity signal in the picture signal, and a series of decoding periods TD3, TD4 in the first and second recording level standard signals Src1, Src2 agrees with a period of the luminance signal in the picture signal.

Thereafter, the first composite recording signal Scr1 generated in the first composite signal generating section 46a is converted into an analog signal in a first digital-to-analog converter 51a and is modulated according to a frequency modulation in a first modulator 52a. Also, the second composite recording signal Scr2 generated in the second composite signal generating section 46b is converted into an analog signal in a second digital-to-analog converter 51b and is modulated according to a frequency modulation in a second modulator 52b. Thereafter, the first composite recording signal Scr1 modulated is amplified in a first recording amplifier 53a and is recorded in a magnetic tape TT through a first magnetic head 54a and a second magnetic head 54b. That is, the first composite recording signal Scr1 shown in FIG. 17A is divided into a first even-numbered recording signal ranging from a switching signal Ssw to a half of a picture signal pertaining to the 556-line and a second even-numbered recording signal ranging from the other half of the picture signal pertaining to the 556-line to a picture signal pertaining to the 1118-line. Thereafter, the first even-numbered recording signal is recorded in the magnetic tape TT through the first magnetic head 54a, and the second even-numbered recording signal is recorded in the magnetic tape TT through the second magnetic head 54b.

Also, the second composite recording signal Scr2 modulated is amplified in a second recording amplifier 53b and is recorded in the magnetic tape TT through a first magnetic head 55a and a second magnetic head 55b. That is, the second composite recording signal Scr2 shown in FIG. 17B is divided into a first odd-numbered recording signal ranging from a switching signal Ssw to a half of a picture signal pertaining to the 557-line and a second odd-numbered recording signal ranging from the other half of the picture signal pertaining to the 557-line to a picture signal pertaining to the 1119-line. Thereafter, the first odd-numbered recording signal is recorded in the magnetic tape TT through the first magnetic head 55a, and the second odd-numbered recording signal is recorded in the magnetic tape TT through the second magnetic head 55b.

Figure 19:
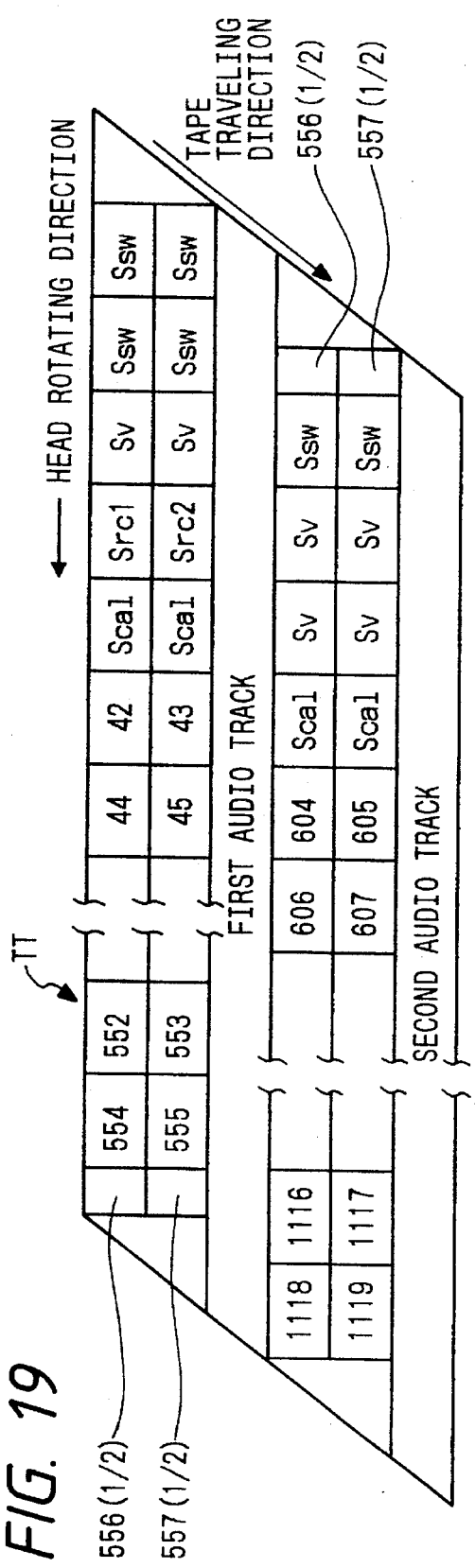
FIG. 19 shows a magnetic tape pattern of a picture signal and first and second composite recording signals Scr1, Scr2 recorded in a magnetic tape TT according to the first embodiment.

FIG. 19 shows a magnetic tape pattern of the picture signal and the first and second composite recording signals Scr1, Scr2 recorded in the magnetic tape TT.

As shown in FIG. 19, the first even-numbered recording signal of the first composite recording signal Scr1 is recorded in a first even-numbered track of the magnetic tape TT with the first magnetic head 54a, and the first odd-numbered recording signal of the second composite recording signal Scr2 is recorded in a first odd-numbered track of the magnetic tape TT with the first magnetic head 55a. The recording of the first even-numbered recording signal is performed simultaneously with that of the first odd-numbered recording signal. In addition, an audio signal is recorded in a first audio track with a first audio magnetic head (not shown) preceding the first and second magnetic heads 54a, 55a.

Also, the second even-numbered recording signal of the first composite recording signal Scr1 is recorded in a second even-numbered track of the magnetic tape TT with the second magnetic head 54b succeeding the first magnetic head 54a, and the second odd-numbered recording signal of the second composite recording signal Scr2 is recorded in a second odd-numbered track of the magnetic tape TT with the second magnetic head 55b succeeding the first magnetic head 55a. The recording of the second even-numbered recording signal is performed simultaneously with that of the second odd-numbered recording signal. In addition, another audio signal is recorded in a second audio track with a second audio magnetic head (not shown) preceding the first and second magnetic heads 54b, 55b.

Accordingly, the input level standard signal Sst added to the 603-line or the 604-line of each of the luminance signal Y, the first color difference signal PB and the second color difference signal PR can be substantially recorded in the magnetic tape TT.

Figure 20:
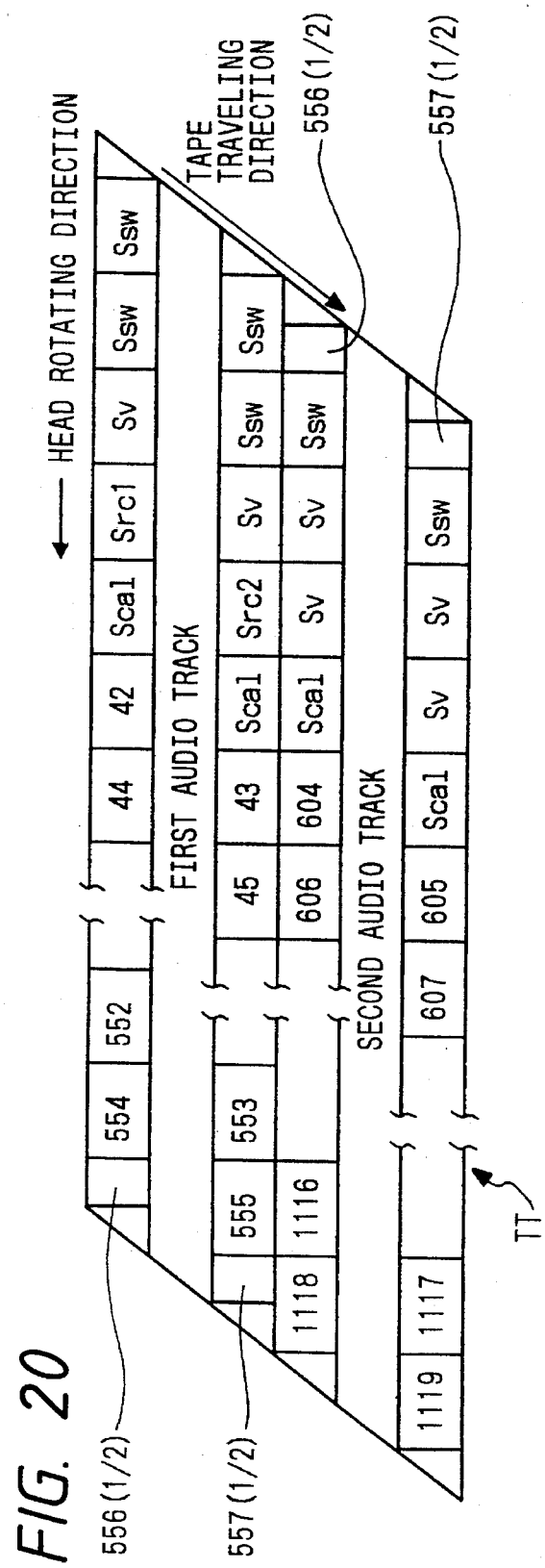
FIG. 20 shows a magnetic tape pattern of a picture signal and first and second composite recording signals Scr1, Scr2 recorded in a magnetic tape TT according to a modification of the first embodiment.

The magnetic tape pattern is not limited to that shown in FIG. 19. That is, in cases where the positional relationship in the height of the magnetic heads 54a, 54b, 55a, 55b and the audio magnetic heads attached to a rotational drum is suitably adjusted, a magnetic tape patter shown in FIG. 20 can be obtained.

Next, a high-definition picture signal reproducing system in the high-definition picture signal recording/reproducing apparatus is described with reference to FIG. 21.

Figure 21:
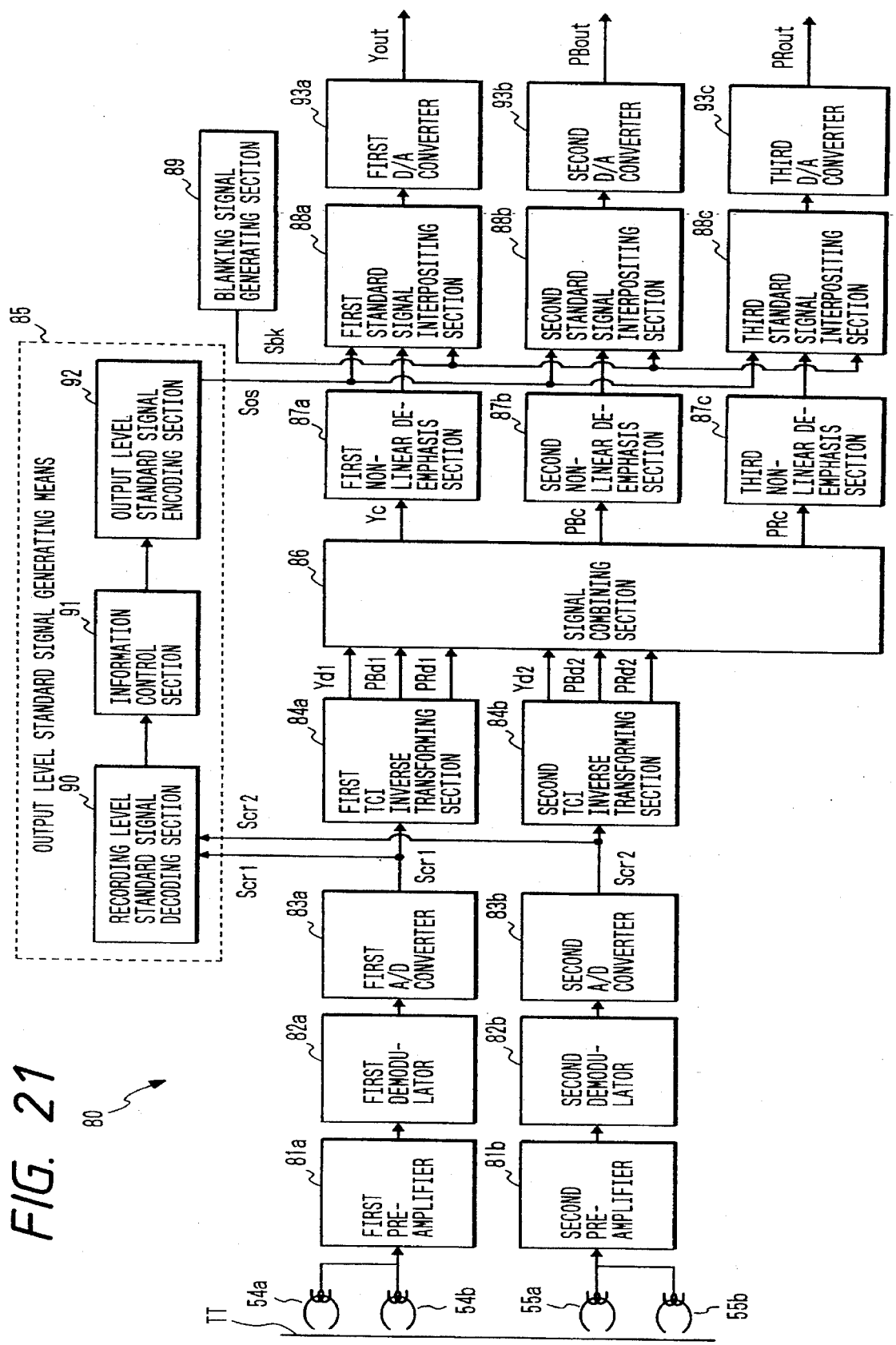
FIG. 21 is a block diagram of a high-definition picture signal reproducing system in a high-definition picture signal recording/reproducing apparatus according to the first embodiment.

FIG. 21 is a block diagram of a high-definition picture signal reproducing system in the high-definition picture signal recording/reproducing apparatus according to the first embodiment.

As shown in FIG. 21, in a high-definition picture signal reproducing system 80, the first even-numbered recording signal of the first composite recording signal Scr1 recorded in the first even-numbered track of the magnetic tape TT is reproduced with the first magnetic head 54a, and the first odd-numbered recording signal of the second composite recording signal Scr2 recorded in the first odd-numbered track of the magnetic tape TT is reproduced with the first magnetic head 55a. Also, the second even-numbered recording signal of the first composite recording signal Scr1 recorded in the second even-numbered track of the magnetic tape TT is reproduced with the second magnetic head 54b, and the second odd-numbered recording signal of the second composite recording signal Scr2 recorded in the second odd-numbered track of the magnetic tape TT is reproduced with the second magnetic head 55b. The first composite recording signal Scr1 reproduced is amplified in a first pre-amplifier 81a and is demodulated in a first demodulator 82a. Also, the second composite recording signal Scr2 reproduced is amplified in a second pre-amplifier 81b and is demodulated in a second demodulator 82b. Thereafter, the first composite recording signal Scr1 demodulated is converted into an analog signal in a first analog-to-digital converter 83a and is transferred to a first TCI inverse transforming section 84a and an output level standard signal generation means 85, and the second composite recording signal Scr2 demodulated is converted into an analog signal in a second analog-to-digital converter 83b and is transferred to a second TCI inverse transforming section 84b and the output level standard signal generation means 85.

The first TCI inverse transforming section 84a complementarily relates to the first TCI processing section 45a, and the second TCI inverse transforming section 84b complementarily relates to the second TCI processing section 45b. In detail, the first TCI signal St1 of the first recording level standard signal Scr1 is divided into the first compressed luminance signal and the first compressed line-order chromaticity signal in the first TCI inverse transforming section 84a, and the first compressed luminance signal and the first compressed line-order chromaticity signal are respectively expanded in the first TCI inverse transforming section 84a to form the first Y signal Yd1, the first PB signal PBd1 and the first PR signal PRd1. The first Y signal Yd1, the first PB signal PBd1 and the first PR signal PRd1 are transferred to a signal combining section 86. Also, the second TCI signal St2 in the second recording level standard signal Scr2 are divided into the second compressed luminance signal and the second compressed line-order chromaticity signal, and the second compressed luminance signal and the second compressed line-order chromaticity signal are respectively expanded in the second TCI inverse transforming section 84b to form the second Y signal Yd2, the second PB signal PBd2 and the second PR signal PRd2. The second Y signal Yd2, the second PB signal PBd2 and the second PR signal PRd2 are transferred to the signal combining section 86.

The signal combining section 86 complementarily relates to the signal dividing section 44. In detail, the first and second Y signals Yd1, Yd2 are combined with each other in the signal combining section 86 to form a composite luminance signal Yc, the first and second PB signals PBd1, PBd2 are combined with each other in the signal combining section 86 to form a composite first color difference signal PBc, and the first and second PR signals PRd1, PRd2 are combined with each other in the signal combining section 86 to form a composite second color difference signal PRc. The composite luminance signal Yc is transferred to a first non-linear de-emphasis section 87a, the composite first color difference signal PBc is transferred to a second non-linear de-emphasis section 87b, and the composite second color difference signal PRc is transferred to a third non-linear de-emphasis section 87c.

In the first non-linear de-emphasis section 87a, high frequency components of the composite luminance signal Yc are attenuated as compared with low frequency components of the composite luminance signal Yc, in dependence on an amplitude level of the composite luminance signal Yc. Thereafter, the composite luminance signal Yc de-emphasized is transferred to a first standard signal interposing section 88a. In the second non-linear de-emphasis section 87b, high frequency components of the composite first color difference signal PBc are attenuated as compared with low frequency components of the composite first color difference signal PBc, in dependence on an amplitude level of the composite first color difference signal PBc. Thereafter, the composite first color difference signal PBc de-emphasized is transferred to a second standard signal interposing section 88b. In the third non-linear de-emphasis section 87c, high frequency components of the composite second color difference signal PRc are attenuated as compared with low frequency components of the composite second color difference signal PRc, in dependence on an amplitude level of the composite second color difference signal PRc. Thereafter, the composite second color difference signal PRc de-emphasized is transferred to a third standard signal interposing section 88c.

In a blanking signal generating section 89, a first blanking signal Sbk pertaining to vertical blanking periods and horizontal synchronizing periods in the composite luminance signal Yc, the composite first color difference signal PBc and the composite second color difference signal PRc is generated, and the first blanking signal Sbk is transferred to the first standard signal interposing section 88a, the second standard signal interposing section 88b and the third standard signal interposing section 88c.

In the output level standard signal generating means 85, the first recording level standard signal Src1 of the first composite recording signal Scr1 converted in the first analog-to-digital converter 83a is selectively decoded in a recording level standard signal decoding section 90. That is, a piece of prescribed information is obtained by decoding the recording information signals Srf1, Srf2 of the first recording level standard signal Src1 compressed in the decoding periods TD1, TD3 shown in FIG. 18, and a piece of reference level information is obtained by decoding the recording level reference signals Srre of the first recording level standard signal Src1 compressed in the decoding periods TD2, TD4 shown in FIG. 18. Also, the second recording level standard signal Src2 of the second composite recording signal Scr2 converted in the second analog-to-digital converter 83b is selectively decoded in the recording level standard signal decoding section 90. That is, another piece of prescribed information is obtained by decoding the recording information signals Srf1, Srf2 of the second recording level standard signal Src2 compressed in the decoding periods TD1, TD3, and another piece of reference level information is obtained by decoding the recording level reference signals Srr1, Srr2 of the second recording level standard signal Src2 compressed in the decoding periods TD2, TD4. The prescribed information and the reference level information are transferred to an information control section 91. In the information control section 91, the prescribed information is replaced with pieces of renewed information if necessary. Thereafter, the prescribed information or the renewed information and the reference level information are transferred to an output level standard signal encoding section 92 as pieces of input information. In the output level standard signal encoding section 92, an output information signal which is composed of output level information signals and an output level identifying signal formed by changing the recording levels of the recording information signals Srf1, Srf2 and the recording level identifying signal Srid compressed in the decoding periods TD1, TD3 is generated according to the input information, and an output level reference signal which is composed of output level reference signals formed by changing the recording levels of the recording level reference signals Srr1, Srr2 compressed in the coding periods TD2, TD4 is generated according to the input information. Thereafter, an output level standard signal Sos composed of the output information signal and the output level reference signal is transferred to the first standard signal interposing section 88a, the second standard signal interposing section 88b and the third standard signal interposing section 88c.

In the first standard signal interposing section 88a, the composite luminance signal Yc de-emphasized, the output level standard signal Sos generated in the output level standard signal encoding section 92 and the first blanking signal Sbk generated in the blanking signal generating section 89 are combined to form an output luminance signal Yout. The output luminance signal Yout is transferred to a first digital-to-analog converter 93a to convert into a digital signal, and the output luminance signal Yout converted is output to a luminance transmission path (not shown). In the second standard signal interposing section 88b, the composite first color difference signal PBc de-emphasized, the output level standard signal Sos and the first blanking signal Sbk are combined to form an output first color difference signal PBout. The output first color difference signal PBout is transferred to a second digital-to-analog converter 93b to convert into a digital signal, anti the output first color difference signal PBout converted is output to a first color difference transmission path (not shown). In the third standard signal interposing section 88c, the composite second color difference signal PRc de-emphasized, the output level standard signal Sos and the first blanking signal Sbk are combined to form an output second color difference signal PRout. The output second color difference signal PRout is transferred to a third digital-to-analog converter 93c to convert into a digital signal, and the output second color difference signal PRout converted is output to a second color difference transmission path (not shown).

Accordingly, even though 1032 horizontal scanning lines selected from among the horizontal scanning lines of a HD signal are recorded in the magnetic tape TT according to a MUSE standard in cases where an input level standard signal Sst is added to the 603-line or the 604-line of the HD signal, the input level standard signals Sst of the input signals Y, PB and PR can be converted into the recording level standard signals Src1, Src2, and the recording level standard signals Src1, Src2 can be recorded in the magnetic tape TT.

Also, in cases where the recording level standard signals Src1, Src2 are reproduced from The magnetic tape TT, the recording level standard signals Src1, Src2 can be converted into the output level standard signal Sos, and a HD picture signal in which the output level standard signal Sos is added to the 603-line or the 604-line can be output as the output luminance signal Yout, the output first color difference signal PBout or the output first color difference signal PBout. Therefore, in cases where the HD picture signals such as the output luminance signal Yout, the output first color difference signal PBout and the output first color difference signal PBout are input to a high-vision apparatus, amplitude levels of the HD signals can be easily controlled.

In the above embodiment, the amplitude level reference signals Sre in the first and second recording level standard signals Src1, Src2 are generated in the recording level standard signal encoding section 50 according to the amplitude level reference signals Sre of the amplitude level standard signals Sst. However, because signal/noise ratios in the amplitude level reference signals Sre are degraded by repeatedly performing a dubbing operation in a video tape recorder in which the magnetic tape TT is utilized as a recording medium, it is preferred that a read only memory (ROM) be provided in the recording level standard signal encoding section 50 to store the amplitude level reference signals Sre of the first and second recording level standard signals Src1, Src2. Also, because signal/noise ratios in the output level reference signal of the output level standard signal Sos generated in the output level standard signal encoding section 92 are degraded in the same manner, it is preferred that a read only memory (ROM) be provided in the output level standard signal encoding section 92 to store the output level reference signal of the output level standard signal Sos.

Also, a video tape recorder in which the magnetic tape TT is utilized as a recording medium is an example of the high-definition picture signal recording/reproducing apparatus according to the present invention. However, the recording medium is not limited to the magnetic tape TT of the video tape recorder. That is, an optical disk, a floppy disk, a semiconductor memory or the like is applicable as the recording medium.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A high-definition picture signal recording apparatus for recording a high-definition picture signal in which an input level standard signal indicating an amplitude level of the high-definition picture signal is added to a particular horizontal scanning line, comprising:

level correcting means for correcting the amplitude level of the high-definition picture signal to a corrected level according to an input level reference signal of the input level standard signal added to the particular horizontal scanning line of the high-definition picture signal;

recording level reference signal generating means for generating a recording level reference signal according to the input level reference signal of the input level standard signal interposed in the high-definition picture signal of which the amplitude level is corrected by the level correcting means;

high-definition picture signal processing means for processing the high-definition picture signal of which the amplitude level is corrected by the level correcting means by deleting line signals of the high-definition picture signal allocated to peripheral horizontal scanning lines placed at upper and lower peripheral portions of an image plane and deleting the input level reference signal of the input level standard signal interposed in the high-definition picture signal, a recording picture signal, being generated from the high-definition picture signal processing means;

composite signal generating means for interposing the recording level reference signal generated from the recording level reference signal generating means in the recording picture signal generated from the high-definition picture signal processing means to generate a composite signal; and recording means for recording the composite signal generated from the composite signal generating means on a recording medium.

2. An apparatus according to claim 1, further including:

input level standard signal generating means for generating the input level standard signal interposed in the high-definition picture signal, the input level standard signal generating means comprising an identifying signal generating element for generating an identifying signal to identify the input level standard signal, an input level reference signal generating element for generating the input level reference signal, an input level standard signal generating element for generating the input level standard signal by combining the identifying signal generated from the identifying signal generating element and the input level reference signal generated from the input level reference signal generating element, a horizontal scanning line specifying element for specifying the particular horizontal scanning line of the high-definition picture signal, and an interposing element for interposing the input level standard signal generated from the input level standard signal generating element in the particular horizontal scanning line of the high-definition picture signal specified by the horizontal scanning line specifying element, the high-definition picture signal in which the input level standard signal is interposed being sent to the level correcting means.

3. An apparatus according to claim 2, further including:

sink level detecting means for detecting an amplitude level of a horizontal synchronizing signal of the high-definition picture signal, reference levels of the input level reference signal generated from the input level reference signal generating element being adjusted according to the amplitude level of the horizontal synchronizing signal.

4. An apparatus according to claim 2 in which the level correcting means comprises:

a horizontal scanning line distinguishing element for distinguishing the particular horizontal scanning line of the high-definition picture signal;

an identifying signal detecting element for detecting the identifying signal generated from the identifying signal generating element;

a timing generating element for detecting a common period of a distinguishing period of the particular horizontal scanning line distinguished by the horizontal scanning line distinguishing element and a detecting period of the identifying signal detected by the identifying signal detecting element and generating a sample signal synchronizing with the input level reference signal generated from the input level reference signal generating element;

a reference level detecting element for detecting a reference level of the input level reference signal generated from the input level reference signal generating element by synchronizing the input level reference signal with the sample signal generated from the timing generating element;

a comparing element for comparing the reference level of the input level reference signal with a comparing reference level stored in the comparing element in advance and generating a control signal to adjust the amplitude level of the high-definition picture signal to the comparing reference level; and an automatic gain controlling element for adjusting the amplitude level of the high-definition picture signal to the comparing reference level according to the control signal generated from the comparing element.

5. An apparatus according to claim 2 in which the level correcting means comprises:

a horizontal scanning line distinguishing element for distinguishing the particular horizontal scanning line of the high-definition picture signal;

an identifying signal detecting element for detecting the identifying signal generated from the identifying signal generating element;

a timing generating element for detecting a common period of a distinguishing period of the particular horizontal scanning line distinguished by the horizontal scanning line distinguishing element and a detecting period of the identifying signal detected by the identifying signal detecting element and generating first and second sampling signals synchronizing with first and second amplitude levels of the input level reference signal generated from the input level reference signal generating element;

a first level detecting element for detecting the first amplitude level of the input level reference signal generated from the input level reference signal generating element by synchronizing the input level reference signal with the first sampling signal generated from the timing generating element;

a second level detecting element for detecting the second amplitude level of the input level reference signal generated from the input level reference signal generating element by synchronizing the input level reference signal with the second sampling signal generated from the timing generating element;

a comparing element for obtaining an amplitude level difference between the first and second amplitude levels of the input level reference signal detected by the first and second level detecting elements, comparing the amplitude level difference with a comparing reference level stored in the comparing element in advance, and generating a control signal to adjust the amplitude level of the high-definition picture signal to the comparing reference level; and an automatic gain controlling element for adjusting the amplitude level of the high-definition picture signal to the comparing reference level according to the control signal generated from the comparing element.

6. A high-definition picture signal reproducing apparatus, comprising:

composite signal reproducing means for reproducing a composite signal from a recording medium, the composite signal being composed of a recording picture signal obtained by deleting line signals of an input high-definition picture signal allocated to peripheral horizontal scanning lines placed at upper and lower peripheral portions of an image plane and a recording level reference signal indicating an amplitude level of the recording picture signal;

output level reference signal generating means for generating an output level reference signal according to the recording level reference signal included in the composite signal reproduced from the composite signal reproducing means;

output high-definition picture signal generating means for generating an output high-definition picture signal by interposing the output level reference signal generated from the output level reference signal generating means in the recording picture signal of the composite signal reproduced from the composite signal reproducing means, the output level reference signal being added to a particular horizontal scanning line of the output high-definition picture signal, and the output level reference signal indicating an amplitude level of the output high-definition picture signal; and output means for outputting the output high-definition picture signal.

7. A high-definition picture signal recording/reproducing apparatus for recording an input high-definition picture signal in which an input level standard signal indicating an amplitude level of the input high-definition picture signal is added to a particular horizontal scanning line and reproducing an output high-definition picture signal, comprising:

level correcting means for correcting the amplitude level of the input high-definition picture signal to a corrected level according to an input level reference signal of the input level standard signal added to the particular horizontal scanning line of the input high-definition picture signal;

recording level reference signal generating means for generating a recording level reference signal according to the input level reference signal of the input level standard signal interposed in the input high-definition picture signal of which the amplitude level is corrected by the level correcting means;

high-definition picture signal processing means for processing the input high-definition picture signal of which the amplitude level is corrected by the level correcting means by deleting line signals of the input high-definition picture signal allocated to peripheral horizontal scanning lines placed at upper and lower peripheral portions of an image plane and deleting the input level reference signal of the input level standard signal interposed in the input high-definition picture signal, a recording picture signal being generated from the high-definition picture signal processing means;

composite signal generating means for interposing the recording level reference signal generated from the recording level reference signal generating means in the recording picture signal generated from the high-definition picture signal processing means to generate a composite signal, the recording level reference signal indicating an amplitude level of the recording picture signal;

recording and reproducing means for recording the composite signal generated from the composite signal generating means on a recording medium and reproducing the composite signal from the recording medium;

output level reference signal generating means for generating an output level reference signal according to the recording level reference signal included in the composite signal reproduced from the recording and reproducing means;

output high-definition picture signal generating means for generating an output high-definition picture signal by interposing the output level reference signal generated from the output level reference signal generating means in the recording picture signal of the composite signal reproduced from the composite signal reproducing means, the output level reference signal being added to a particular horizontal scanning line of the output high-definition picture signal, and the output level reference signal indicating an amplitude level of the output high-definition picture signal; and output means for outputting the output high-definition picture signal.

8. An apparatus according to claim 7, further including:

input level standard signal generating means for generating the input level standard signal interposed in the input high-definition picture signal, the input level standard signal generating means comprising
  an identifying signal generating element for generating an identifying signal to identify the input level standard signal,
  an input level reference signal generating element for generating the input level reference signal,
  an input level standard signal generating element for generating the input level standard signal by combining the identifying signal generated from the identifying signal generating element and the input level reference signal generated from the input level reference signal generating element,
  a horizontal scanning line specifying element for specifying the particular horizontal scanning line of the input high-definition picture signal, and
  an interposing element for interposing the input level standard signal generated from the input level standard signal generating element in the particular horizontal scanning line of the input high-definition picture signal specified by the horizontal scanning line specifying element, the input high-definition picture signal in which the input level standard signal is interposed being sent to the level correcting means.

9. An apparatus according to claim 8, further including:
sink level detecting means for detecting an amplitude level of a horizontal synchronizing signal of the input high-definition picture signal, reference levels of the input level reference signal generated from the input level reference signal generating element being adjusted according to the amplitude level of the horizontal synchronizing signal.

10. An apparatus according to claim 8 in which the level correcting means comprises:
  a horizontal scanning line distinguishing element for distinguishing the particular horizontal scanning line of the input high-definition picture signal;
  an identifying signal detecting element for detecting the identifying signal generated from the identifying signal generating element;
  a timing generating element for detecting a common period of a distinguishing period of the particular horizontal scanning line distinguished by the horizontal scanning line distinguishing element and a detecting period of the identifying signal detected by the identifying signal detecting element and generating a sample signal synchronizing with the input level reference signal generated from the input level reference signal generating element;
  a reference level detecting element for detecting a reference level of the input level reference signal generated from the input level reference signal generating element by synchronizing the input level reference signal with the sample signal generated from the timing generating element;
  a comparing element for comparing the reference level of the input level reference signal with a comparing reference level stored in the comparing element in advance and generating a control signal to adjust the amplitude level of the input high-definition picture signal to the comparing reference level; and
  an automatic gain controlling element for adjusting the amplitude level of the input high-definition picture signal to the comparing reference level according to the control signal generated from the comparing element.

11. An apparatus according to claim 8 in which the level correcting means comprises:
  a horizontal scanning line distinguishing element for distinguishing the particular horizontal scanning line of the input high-definition picture signal;
  an identifying signal detecting element for detecting the identifying signal generated from the identifying signal generating element;
  a timing generating element for detecting a common period of a distinguishing period of the particular horizontal scanning line distinguished by the horizontal scanning line distinguishing element and a detecting period of the identifying signal detected by the identifying signal detecting element and generating first and second sampling signals synchronizing with first and second amplitude levels of the input level reference sisal generated from the input level reference signal generating element;
  a first level detecting element for detecting the first amplitude level of the input level reference signal generated from the input level reference signal generating element by synchronizing the input level reference signal with the first sampling signal generated from the timing generating element;
  a second level detecting element for detecting the second amplitude level of the input level reference signal generated from the input level reference signal generating element by synchronizing the input level reference signal with the second sampling signal generated from the timing generating element;

a comparing element for obtaining an amplitude level difference between the first and second amplitude levels of the input level reference signal detected by the first and second level detecting elements, comparing the amplitude level difference with a comparing reference level stored in the comparing element in advance, and generating a control signal to adjust the amplitude level of the input high-definition picture signal to the comparing reference level; and an automatic gain controlling element for adjusting the amplitude level of the input high-definition picture signal to the comparing reference level according to the control signal generated from the comparing element.

12. A high-definition picture signal recording apparatus for recording a high-definition picture signal in which an input level standard signal composed of an input level reference signal indicating an amplitude level of the high-definition picture signal and an input information signal indicating a piece of prescribed information;is added to a particular horizontal scanning line, comprising:

level correcting means for correcting the amplitude level of the high-definition picture signal to a corrected level according to the input level reference signal of the input level standard signal added to the particular horizontal scanning line of the high-definition picture signal;

recording level reference signal generating means for generating a recording level reference signal according to the input level reference signal of the input level standard signal interposed in the high-definition picture signal of which the amplitude level is corrected by the level correcting means;

high-definition picture signal processing means for processing the high-definition picture signal of which the amplitude level is corrected by the level correcting means by deleting line signals of the high-definition picture signal allocated to peripheral horizontal scanning lines placed at upper and lower peripheral portions of an image plane and deleting the input level reference signal of the input level standard signal interposed in the high-definition picture signal, a recording picture signal being generated from the high-definition picture signal processing means;

recording information signal generating means for replacing the piece of prescribed information obtained by decoding the input information signal of the input level standard signal interposed in the high-definition picture signal of which the amplitude level is corrected by the level correcting means with a piece of new information and generating a recording information signal by encoding the new information;

composite signal generating means for interposing the recording level reference signal generated from the recording level reference signal generating means and the recording information signal generated from the recording information signal generating means in the recording picture signal generated from the high-definition picture signal processing means to generate a composite signal; and recording means for recording the composite signal generated from the composite signal generating means on a recording medium.

13. An apparatus according to claim 12, further including:

input level standard signal generating means for generating the input level standard signal interposed in the high-definition picture signal, the input level standard signal generating means comprising an identifying signal generating element for generating an identifying signal to identify the input level standard signal, an input level reference signal generating element for generating the input level reference signal, an information signal generating element for generating the input information signal, an input level standard signal generating element for generating the input level standard signal by combining the identifying signal generated from the identifying signal generating element, the input level reference signal generated from the input level reference signal generating element, and the input information signal generated from the information signal generating element, a horizontal scanning line specifying element for specifying the particular horizontal scanning line of the high-definition picture signal, and an interposing element for interposing the input level standard signal generated from the input level standard signal generating element in the particular horizontal scanning line of the high-definition picture signal specified by the horizontal scanning line specifying element, the high-definition picture signal in which the input level standard signal is interposed being sent to the level correcting means.

14. An apparatus according to claim 13, further including:

sink level detecting means for detecting an amplitude level of a horizontal synchronizing signal of the high-definition picture signal, reference levels of the input level reference signal generated from the input level reference signal generating element being adjusted according to the amplitude level of the horizontal synchronizing signal.

15. An apparatus according to claim 13 in which the level correcting means comprises:

a horizontal scanning line distinguishing element for distinguishing the particular horizontal scanning line of the high-definition picture signal;

an identifying signal detecting element for detecting the identifying signal generated from the identifying signal generating element;

a timing generating element for detecting a common period of a distinguishing period of the particular horizontal scanning line distinguished by the horizontal scanning line distinguishing element and a detecting period of the identifying signal detected by the identifying signal detecting element and generating a sample signal synchronizing with the input level reference signal generated from the input level reference signal generating element;

a reference level detecting element for detecting a reference level of the input level reference signal generated from the input level reference signal generating element by synchronizing the input level reference signal with the sample signal generated from the timing generating element;

a comparing element for comparing the reference level of the input level reference signal with a comparing reference level stored in the comparing element in advance and generating a control signal to adjust the amplitude level of the high-definition picture signal to the comparing reference level; and an automatic gain controlling element for adjusting the amplitude level of the high-definition picture signal to the comparing reference level according to the control signal generated from the comparing element.

16. An apparatus according to claim 13 in which the level correcting means comprises:

a horizontal scanning line distinguishing element for distinguishing the particular horizontal scanning line of the high-definition picture signal;

an identifying signal detecting element for detecting the identifying signal generated from the identifying signal generating element;

a timing generating element for detecting a common period of a distinguishing period of the particular horizontal scanning line distinguished by the horizontal scanning line distinguishing element and a detecting period of the identifying signal detected by the identifying signal detecting element and generating first and second sampling signals synchronizing with first and second amplitude levels of the input level reference signal generated from the input level reference signal generating element;

a first level detecting element for detecting the first amplitude level of the input level reference signal generated from the input level reference signal generating element by synchronizing the input level reference signal with the first sampling signal generated from the timing generating element;

a second level detecting element for detecting the second amplitude level of the input level reference signal generated from the input level reference signal generating element by synchronizing the input level reference signal with the second sampling signal generated from the timing generating element;

a comparing element for obtaining an amplitude level difference between the first and second amplitude levels of the input level reference signal detected by the first and second level detecting elements, comparing the amplitude level difference with a comparing reference level stored in the comparing element in advance, and generating a control signal to adjust the amplitude level of the high-definition picture signal to the comparing reference level; and an automatic gain controlling element for adjusting the amplitude level of the high-definition picture signal to the comparing reference level according to the control signal generated from the comparing element.

17. A high-definition picture signal reproducing apparatus, comprising:

composite signal reproducing means for reproducing a composite signal from a recording medium, the composite signal being composed of a recording picture signal obtained by deleting line signals of an input high-definition picture signal allocated to peripheral horizontal scanning lines placed at upper and lower peripheral portions of an image plane, a recording level reference signal indicating an amplitude level of the recording picture signal and a recording information signal indicating a prescribed information;

output level reference signal generating means for generating an output level reference signal according to the recording level reference signal included in the composite signal reproduced from the composite signal reproducing means;

output information signal generating means for replacing the prescribed information obtained by decoding the recording information signal of the composite signal reproduced from the composite signal reproducing means with a piece of new information and generating an output information signal by encoding the new information;

output high-definition picture signal generating means for generating an output high-definition picture signal by interposing an output level standard signal composed of the output level reference signal generated from the output level reference signal generating means and the output information signal generated from the output information signal generating means in the recording picture signal of the composite signal reproduced from the composite signal reproducing means, the output level standard signal being added to a particular horizontal scanning line of the output high-definition picture signal, and the output level reference signal indicating an amplitude level of the output high-definition picture signal; and output means for outputting, the output high-definition picture signal.

18. A high-definition picture signal recording/reproducing apparatus for recording an input high-definition picture signal in which an input level standard signal composed of an input level reference signal indicating an amplitude level of the input high-definition picture signal and an input information signal indicating a piece of prescribed information is added to a particular horizontal scanning line and reproducing an output high-definition picture signal, comprising:

level correcting means for correcting the amplitude level of the input high-definition picture signal to a corrected level according to the input level reference signal of the input level standard signal added to the particular horizontal scanning line of the input high-definition picture signal;

recording level reference signal generating means for generating a recording level reference signal according to the input level reference signal of the input level standard signal interposed in the input high-definition picture signal of which the amplitude level is corrected by the level correcting means;

high-definition picture signal processing means for processing the input high-definition picture signal of which the amplitude level is corrected by the level correcting means by deleting line signals of the input high-definition picture signal allocated to peripheral horizontal scanning lines placed at upper and lower peripheral portions of an image plane and deleting the input level reference signal of the input level standard signal interposed in the input high-definition picture signal, a recording picture signal being generated from the high-definition picture signal processing means;

recording information signal generating means for replacing the piece of prescribed information obtained by decoding the input information signal of the input level standard signal interposed in the input high-definition picture signal of which the amplitude level is corrected by the level correcting means with a piece of first replaced information and generating a recording information signal by encoding the first replaced information;

composite signal generating means for interposing the recording level reference signal generated from the recording level reference signal generating means and the recording information signal generated from the recording information signal generating means in the recording picture signal generated from the high-definition picture signal processing means to generate a composite signal;

recording and reproducing meads for recording the composite signal generated from the composite signal generating means on a recording medium and reproducing the composite signal from the recording medium;

output level reference signal generating means for generating an output level reference signal according to the recording level reference signal included in the composite signal reproduced from the recording and reproducing means;

output information signal generating means for replacing the the first replaced information obtained by decoding the recording information signal of the composite signal reproduced from the recording and reproducing means with a piece of second replaced information and generating an output information signal by encoding the second replaced information;

output high-definition picture:signal generating means for generating an output high-definition picture signal by interposing an output level standard signal composed of the output level reference signal generated from the output level reference signal generating means and the output information signal generated from the output information signal generating means in the recording picture signal of the composite signal reproduced from the composite signal reproducing means, the output level standard signal being added to a particular horizontal scanning line of the output high-definition picture signal, and the output level reference signal indicating an amplitude level of the output high-definition picture signal; and output means for outputting the output high-definition picture signal.

20. An apparatus according to claim 19, further including:

sink level detecting means for detecting an amplitude level of a horizontal synchronizing signal of the input high-definition picture signal, reference levels of the input level reference signal generated from the input level reference signal generating element being adjusted according to the amplitude level of the horizontal synchronizing signal.

21. An apparatus according to claim 19 in which the level correcting means comprises:

a horizontal scanning line distinguishing element for distinguishing the particular horizontal scanning line of the input high-definition picture signal;

an identifying signal detecting element for detecting the identifying signal generated from the identifying signal generating element;

a timing generating element for detecting a common period of a distinguishing period of the particular horizontal scanning line distinguished by the horizontal scanning line distinguishing element and a detecting period of the identifying signal detected by the identifying signal detecting element and generating a sample signal synchronizing with the input level reference signal generated from the input level reference signal generating element;

a reference level detecting element for detecting a reference level of the input level reference signal generated from the input level reference signal generating element by synchronizing the input level reference signal with the sample signal generated from the timing generating element;

a comparing element for comparing the reference level of the input level reference signal with a comparing reference level stored in the comparing element in advance and generating a control signal to adjust the amplitude level of the high-definition picture signal to the comparing reference level; and an automatic gain controlling element for adjusting the amplitude level of the input high-definition picture signal to the comparing reference level according to the control signal generated from the comparing element.

19. An apparatus according to claim 18, further including:

input level standard signal generating means for generating the input level standard signal interposed in the input high-definition picture signal, the input level standard signal generating means comprising
  an identifying signal generating element for generating an identifying signal to identify the input level standard signal,
  an input level reference signal generating element for generating the input level reference signal,
  an information signal generating element for generating the input information signal,
  an input level standard signal generating element for generating the input level standard signal by combining the identifying signal generated from the identifying signal generating element, the input level reference signal generated from the input level reference signal generating element, and the input information signal generated from the information signal generating element,
  a horizontal scanning line specifying element for specifying the particular horizontal scanning line of the input high-definition picture signal, and
  an interposing element for interposing the input level standard signal generated from the input level standard signal generating element in the particular horizontal scanning line of the input high-definition picture signal specified by the horizontal scanning line specifying element, the input high-definition picture signal in which the input level standard signal is interposed being sent to the level correcting means.

22. An apparatus according to claim 19 in which the level correcting means comprises:

a horizontal scanning line distinguishing element for distinguishing the particular horizontal scanning line of the input high-definition picture signal;

an identifying signal detecting element for detecting the identifying signal generated from the identifying signal generating element;

a timing generating element for detecting a common period of a distinguishing period of the particular horizontal scanning line distinguished by the horizontal scanning line distinguishing element and a detecting period of the identifying signal detected by the identifying signal detecting element and generating first and second sampling signals synchronizing with first and second amplitude levels of the input level reference signal generated from the input level reference signal generating element;

a first level detecting element for detecting the first amplitude level of the input level reference signal generated from the input level reference signal generating element by synchronizing the input level reference signal with the first sampling signal generated from the timing generating element;

a second level detecting element for detecting the second amplitude level of the input level reference signal generated from the input level reference signal generating element by synchronizing the input level reference signal with the second sampling signal generated from the timing generating element;

a comparing element for obtaining an amplitude level difference between the first and second amplitude levels of the input level reference signal detected by the first and second level detecting elements, comparing the amplitude level difference with a comparing reference level stored in the comparing element in advance, and generating a control signal to adjust the amplitude level of the input high-definition picture signal to the comparing reference level; and an automatic gain controlling element for adjusting the amplitude level of the input high-definition picture signal to the comparing reference level according to the control signal generated from the comparing element.

* * * * *